(12) United States Patent
Kinomura

(10) Patent No.: US 11,038,454 B2
(45) Date of Patent: Jun. 15, 2021

(54) POWER CONVERSION DEVICE AND SERVER

(71) Applicant: KABUSHIKI KAISHA YASKAWA DENKI, Kitakyushu (JP)

(72) Inventor: Hirofumi Kinomura, Fukuoka (JP)

(*) Notice: Subject to any disclaimer, the term of this patent is extended or adjusted under 35 U.S.C. 154(b) by 0 days.

(21) Appl. No.: 16/776,518

(22) Filed: Jan. 30, 2020

(65) Prior Publication Data

US 2020/0169205 A1    May 28, 2020

Related U.S. Application Data

(63) Continuation of application No. PCT/JP2018/024190, filed on Jun. 26, 2018.

(30) Foreign Application Priority Data

Jul. 31, 2017    (JP) .............................. JP2017-147970

(51) Int. Cl.
*H02P 23/00* (2016.01)

(52) U.S. Cl.
CPC ...... *H02P 23/0031* (2013.01); *H02P 2205/01* (2013.01); *H02P 2205/03* (2013.01); *H02P 2205/07* (2013.01)

(58) Field of Classification Search
None
See application file for complete search history.

(56) References Cited

U.S. PATENT DOCUMENTS

| | | | |
|---|---|---|---|
| 5,739,698 A | 4/1998 | Bowers et al. | |
| 6,112,156 A * | 8/2000 | Kang | G01R 31/343 |
| | | | 702/58 |
| 7,308,322 B1 | 12/2007 | Discenzo et al. | |
| 2003/0067277 A1 | 4/2003 | Parlos et al. | |
| 2013/0193895 A1 | 8/2013 | Noguchi et al. | |
| 2013/0345918 A1 * | 12/2013 | Ozaki | B60L 15/025 |
| | | | 701/22 |
| 2015/0103449 A1 * | 4/2015 | Son | H02H 7/093 |
| | | | 361/23 |
| 2015/0202963 A1 * | 7/2015 | Li | B60L 15/2036 |
| | | | 701/33.1 |
| 2016/0139604 A1 | 5/2016 | Ito | |
| 2016/0140009 A1 | 5/2016 | Watanabe et al. | |
| 2016/0163179 A1 | 6/2016 | Matsumoto et al. | |

(Continued)

FOREIGN PATENT DOCUMENTS

| | | |
|---|---|---|
| CN | 104390776 | 3/2015 |
| JP | H6-150178 | 5/1994 |

(Continued)

OTHER PUBLICATIONS

International Search Report dated Sep. 18, 2018 for PCT/JP2018/024190.

(Continued)

*Primary Examiner* — Bentsu Ro
(74) *Attorney, Agent, or Firm* — Soei Patent & Law Firm

(57) ABSTRACT

A power conversion device includes a switching circuitry configured to supply a driving alternating current (AC) power to a motor of a controlled object that includes the motor and a movable part driven by the motor, and detect an abnormality in the controlled object based on the index information acquired.

20 Claims, 11 Drawing Sheets

(56) References Cited

U.S. PATENT DOCUMENTS

| | | |
|---|---|---|
| 2017/0031329 A1 | 2/2017 | Inagaki et al. |
| 2017/0182892 A1* | 6/2017 | Kinoshita ............... B60L 58/20 |
| 2017/0293862 A1 | 10/2017 | Kamiya et al. |
| 2018/0156225 A1* | 6/2018 | Izumi ..................... F04D 25/06 |
| 2018/0375459 A1 | 12/2018 | Tsugawa |

FOREIGN PATENT DOCUMENTS

| | | |
|---|---|---|
| JP | H10-333743 | 12/1998 |
| JP | H11-225498 | 8/1999 |
| JP | H11-290521 | 10/1999 |
| JP | 2011-188653 | 9/2011 |
| JP | 2012-005151 | 1/2012 |
| JP | 2012-137386 | 7/2012 |
| JP | 2015-033300 | 2/2015 |
| JP | 2016-095751 | 5/2016 |
| JP | 2016-096632 | 5/2016 |
| JP | 2016-110594 | 6/2016 |
| JP | 2017-033526 | 2/2017 |
| JP | 6140331 | 5/2017 |
| JP | 2017-127041 | 7/2017 |
| WO | 2012/014249 | 2/2012 |
| WO | 2012/164690 | 12/2012 |
| WO | 2015/047121 | 4/2015 |
| WO | 2017/018035 | 2/2017 |
| WO | 2017/110855 | 6/2017 |

OTHER PUBLICATIONS

International Preliminary Report on Patentability with Written Opinion dated Feb. 13, 2020 for PCT/JP2018/024190.
Office Action issued in Japanese Patent Application No. P2017-147970, dated Oct. 31, 2017 (with English Partial translation).
Office Action issued in Japanese Patent Application No. P2017-147970, dated Mar. 27, 2018 (with English Partial translation).
Extended Search Report in corresponding European Application No. 18842088.9, dated Mar. 25, 2021.

* cited by examiner

POWER CONVERSION DEVICE AND SERVER

CROSS-REFERENCE TO RELATED APPLICATIONS

This application is a continuation application of PCT Application No. PCT/JP2018/024190, filed on Jun. 26, 2018, which claims the benefit of priority from Japanese Patent Application No. 2017-147970, filed on Jul. 31, 2017, the entire contents of which are incorporated herein by reference.

BACKGROUND

1. Field

The present disclosure relates to a power conversion device and a server.

2. Description of the Related Art

Japanese Unexamined Patent Publication No. H11-225498 discloses an inverter device.

SUMMARY

An example power conversion device disclosed herein may include a switching circuitry configured to supply a driving alternating current (AC) power to a motor of a controlled object that includes the motor and a movable part driven by the motor. The power conversion device may further include a control circuitry. The control circuitry may be configured to control the switching circuitry to supply the driving AC power to the motor. The control circuitry may be further configured to acquire index information associated with an operational condition of the motor. The control circuitry may be further configured to detect an abnormality in the controlled object based on the index information acquired.

An example server disclosed herein may include a circuitry configured to acquire a log data of a first index and a second index associated with a condition of a motor driving a movable part from a power conversion device configured to provide a driving AC power to the motor. The circuitry may be further configured to generate a neural network by machine-learning based on the log data, wherein the neural network is configured to detect an abnormality in a controlled object including the motor and the movable part, in response to an input combination including a value of the first index and a value of the second index.

DETAILED DESCRIPTION

Figure 1:
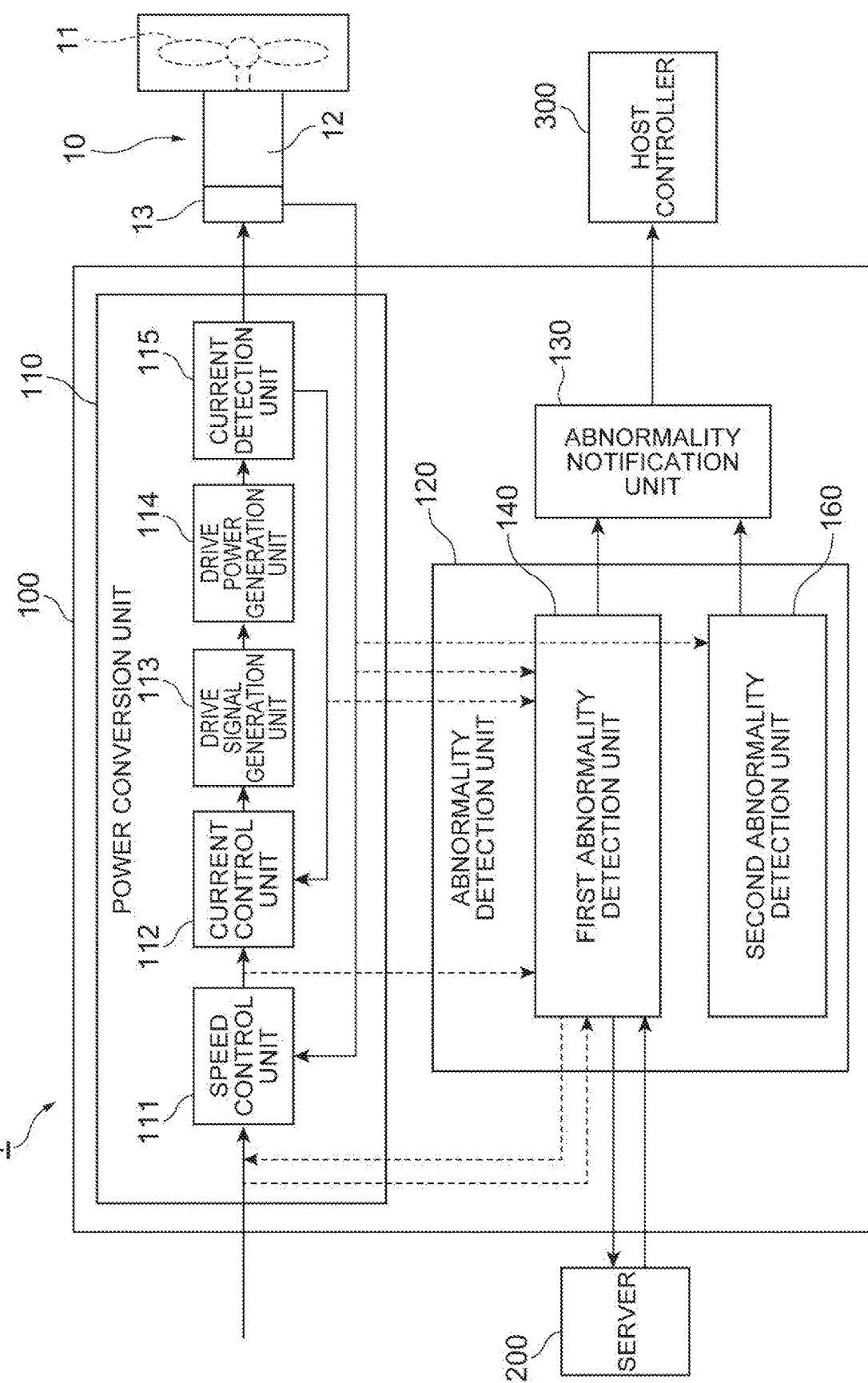
FIG. 1 is a schematic diagram illustrating an example overall structure of a control system.

Hereinafter, with reference to the drawings, the same element or similar elements having the same function are denoted by the same reference numerals, and redundant description is omitted.

1. Control System

An example control system 1 shown in FIG. 1 is a system that controls a controlled object 10 to perform a desired operation, and the control system 1 includes a power conversion device 100, a server 200, and a host controller 300. The power conversion device 100 is an inverter that generates AC power used to cause an operation speed of the controlled object 10 to follow a control command (for example, a frequency command).

The controlled object 10 includes a movable part 11, a motor 12, and a speed sensor 13. The movable part 11 may be mechanically movable. Specific examples of the movable part 11 include a fan for blowing air or a pump for pressure-feeding a liquid. The motor 12 is a power source of the movable part 11. Specific examples of the motor 12 include a rotational synchronous motor or induction motor. Note that the motor 12 may be a linear motor. The speed sensor 13 generates an electrical signal that is proportional to a driving speed (for example, rotation speed or linear-motion speed) of the motor 12. Specific examples of the speed sensor 13 include a pulse generator that generates a pulse signal having a frequency proportional to the driving speed of the motor 12.

The server 200 builds, based on machine-learning, a model for detecting an abnormality in the controlled object 10. The host controller 300 sets the control command for the controlled object 10 and outputs the control command to the power conversion device 100. Specific examples will be given below of structures of the power conversion device 100 and the server 200.

(1) Power Conversion Device

The power conversion device 100 includes a power conversion unit 110, an abnormality detection unit 120, and an abnormality notification unit 130.

The power conversion unit 110 generates AC power for driving the controlled object 10 and outputs the AC power to the motor 12. For example, the power conversion unit 110 generates AC power used to cause the rotation speed of the motor 12 to follow the frequency command (speed command) received from the host controller 300.

The power conversion unit 110 includes a speed control unit 111, a current control unit 112, a drive signal generation unit 113, a drive power generation unit 114, and a current detection unit 115.

The speed control unit 111 calculates a current command (torque command) used to reduce a deviation between the frequency command received from the host controller 300 and the frequency of the pulse signal output from the speed sensor 13.

The current control unit 112 calculates a voltage command used to reduce a deviation between the current command calculated by the speed control unit 111 and the current being output to the motor 12 (hereinafter, referred to as "output current"), and outputs the voltage command to the drive signal generation unit 113.

The drive signal generation unit 113 and the drive power generation unit 114 apply, to the motor 12, AC voltage that has a voltage amplitude in accordance with the voltage command output from the current control unit 112 and has a frequency that allows following of magnetic poles of the motor 12 by, for example, pulse width modulation (PWM). The drive power generation unit 114 generates the AC voltage by, for example, causing a plurality of switching elements to switch connections of positive and negative poles of a DC bus to output line. The drive signal generation unit 113 outputs an on and off command signal to each of the switching elements of the drive power generation unit 114.

The current detection unit 115 detects the output current flowing from the drive power generation unit 114 to the motor 12.

According to the above structure, the driving speed of the motor 12 is feedback-controlled by the speed control unit 111, and the output current to the motor 12 is feedback-controlled by the current control unit 112.

The power conversion unit 110 may have a capability to estimate the driving speed of the motor 12 without a sensor. In this case, information on the driving speed of the motor 12 may be fed back to the speed control unit 111 without using the speed sensor 13 of the controlled object 10.

For example, the power conversion unit 110 may be configured to superimpose a high-frequency signal on the voltage command output from the current control unit 112, extract a current response in accordance with the high-frequency signal from the detection result of the current detection unit 115, estimate, based on the current response, a magnetic pole position of the motor 12, and estimate, based on a change in the magnetic pole position, the driving speed of the motor 12.

The power conversion unit 110 may be configured to input the voltage command in accordance with the frequency command output from the host controller 300 to the drive signal generation unit 113 without feedback on the driving speed and output current.

Further, the power conversion unit 110 may generate AC power used to cause a torque generated by the motor 12 to follow the current command (torque command) received from the host controller 300. This configuration makes the capability of the speed control unit 111 disabled and allows the current command output from the host controller 300 to be input to the current control unit 112.

The abnormality detection unit 120 detects an abnormality in the controlled object 10 based on an index associated with a condition of the motor 12 driving the movable part 11. The abnormality in the controlled object 10 includes both an abnormality in the movable part 11 and an abnormality in the motor 12. In some examples, the abnormality detection unit 120 is capable of detecting an abnormality in the movable part 11 based on a condition of output power to the motor 12. For example, when the movable part 11 is a fan, the abnormality detection unit 120 can detect, based on the condition of output power to the motor 12, an increase in rotational resistance to the fan due to, for example, gathered dust. The condition of output power includes, for example, both a magnitude of output power and a form of the output power.

A first abnormality detection unit 140 detects an abnormality in the controlled object 10 based on a relation between a first index and a second index associated with the condition of the motor 12 driving the movable part.

A second abnormality detection unit 160 detects an abnormality in the controlled object 10 based on a relation between a present value of a third index associated with a condition of the motor 12 driving the controlled object 10 and a trend value derived from past values of the third index acquired during a period from a predetermined time before to a time of acquisition of the present value of the third index.

When an abnormality is detected by the abnormality detection unit 120, the abnormality notification unit 130 notifies the host controller 300 of the detection of the abnormality. For example, the abnormality notification unit 130 transmits, to the host controller 300, an electrical signal representing that the abnormality has been detected by the abnormality detection unit 120.

(First Abnormality Detection Unit)

A specific example of the structure of the first abnormality detection unit 140 of the abnormality detection unit 120 will be given with reference to FIG. 2. The first abnormality detection unit 140 is configured to detect an abnormality in the controlled object 10 in any one of four modes: a manual mode, an auto mode, a hybrid mode, and a learning mode.

The manual mode is a mode where an abnormality in the controlled object 10 is detected based on a determination criterion set in accordance with a user input. The auto mode is a mode where an abnormality in the controlled object 10 is detected based on a determination criterion automatically set using stored log data. The hybrid mode is a mode where an abnormality in the controlled object 10 is detected based on a determination criterion set using both the user input and the stored log data.

The determination criteria in the manual mode, the auto mode, and the hybrid mode include an upper limit and a lower limit of a correlation profile representing a change in the second index in response to a change in the first index. In the manual mode, the auto mode, and the hybrid mode, the first abnormality detection unit 140 determines that there is no abnormality in the controlled object 10 in a case where a combination of a value of the first index and a value of the second index is within a range between the upper limit and the lower limit of the correlation profile, and determines that there is an abnormality in the controlled object 10 in a case where the combination is outside the range between the upper limit and the lower limit of the correlation profile. In a case where the combination of the value of the first index and the value of the second index is equal to the upper limit or the lower limit of the correlation profile, the first abnormality detection unit 140 may determine that there is no abnormality in the controlled object 10 or there is an abnormality in the controlled object 10.

The learning mode is a mode where an abnormality in the controlled object 10 is detected by using a neural network in accordance with an input (input combination) including the combination of the value of the first index and the value of the second index.

Figure 2:
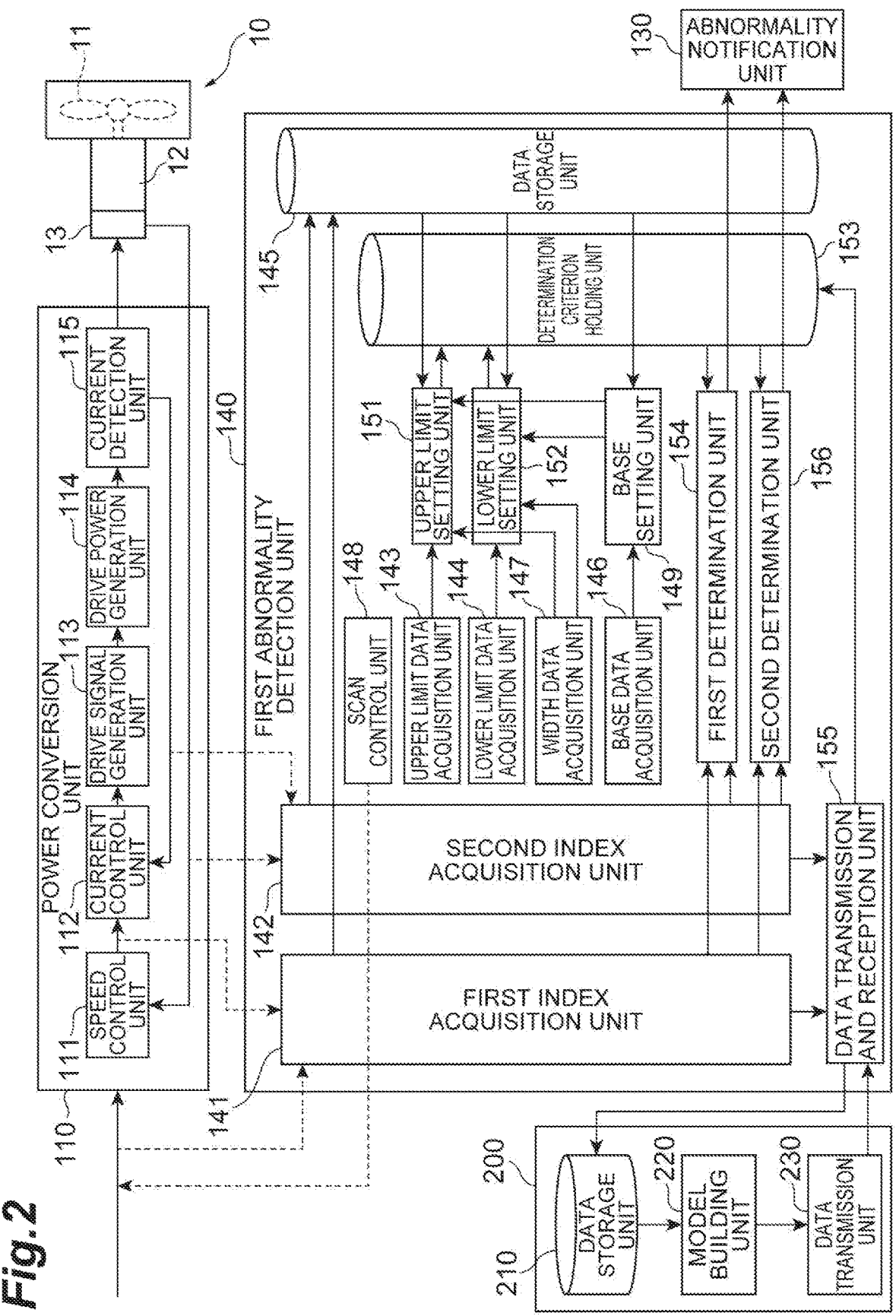
FIG. 2 is a schematic diagram illustrating an example structure of a first abnormality detection unit.

As shown in FIG. 2, the first abnormality detection unit 140 includes a first index acquisition unit 141, a second index acquisition unit 142, an upper limit data acquisition unit 143, a lower limit data acquisition unit 144, a data storage unit 145, a base data acquisition unit 146, a width data acquisition unit 147, a scan control unit 148, a base setting unit 149, an upper limit setting unit 151, a lower limit setting unit 152, a determination criterion holding unit 153, and a first determination unit 154, a data transmission and reception unit 155, and a second determination unit 156.

The first index acquisition unit 141 acquires a value of the first index associated with the condition of the motor 12 driving the movable part 11. Specific examples of the condition include the driving speed (for example, rotation speed or linear-motion speed) of the motor 12, a driving force of the motor 12 (for example, rotation torque or linear-motion thrust generated by the motor 12), driving energy of the motor 12, and the like. The first index may be a command value or a detection value associated with the driving speed of the motor 12, or may be a command value or a detection value associated with the driving force of the motor 12, for example.

For example, the first index acquisition unit 141 acquires the frequency command input to the speed control unit 111 as the command value associated with the driving speed of the motor 12, and acquires the electrical signal fed back from the speed sensor 13 to the speed control unit 111 as the detection value associated with the driving speed of the motor 12. When the power conversion unit 110 has a capability to estimate the driving speed of the motor 12 without a sensor, the first index acquisition unit 141 may acquire an estimated value of the driving speed as the detection value associated with the driving speed. Further, the first index acquisition unit 141 acquires the current command input to the current control unit 112 as the command value associated with the driving force of the motor 12, and acquires a present value fed back from the current detection unit 115 to the current control unit 112 as the detection value associated with the driving force of the motor 12.

The first index acquisition unit 141 may acquire the value of the first index from outside the power conversion device 100 through an external input terminal. For example, the first index acquisition unit 141 may acquire the command value associated with the driving speed or driving force of the motor 12 from the host controller 300, or may acquire the detection value of the driving speed or driving force of the motor 12 directly from a sensor located outside the power conversion device 100. Which value is used as the value of the first index is determined by the user.

The second index acquisition unit 142 acquires a value of the second index associated with the condition of the motor 12 driving the movable part 11. The second index may be a detection value associated with the driving force of the motor 12 or may be a detection value associated with the driving speed of the motor 12, for example.

For example, the second index acquisition unit 142 acquires the present value fed back from the current detection unit 115 to the current control unit 112 as the detection value associated with the driving force of the motor 12, and acquires the electrical signal fed back from the speed sensor 13 to the speed control unit 111 as the detection value associated with the driving speed of the motor 12.

The second index acquisition unit 142 may acquire the value of the second index from outside the power conversion device 100 through the external input terminal. For example, the second index acquisition unit 142 may acquire the detection value of the driving speed or driving force of the motor 12 directly from a sensor located outside the power conversion device 100. Which value is used as the value of the second index is determined by the user.

The second index may be set arbitrarily so long as the second index is correlated with the first index through a condition of the controlled object 10 (whether an abnormality exists). Examples of combinations that have a correlation based on the condition of the controlled object 10 include a combination of the command value of the driving speed and the detection value of the driving force, a combination of the detection value of the driving speed and the detection value of the driving force, a combination of the command value of the driving force and the detection value of the driving speed, and a combination of the detection value of the driving force and the detection value of the driving speed.

Further, there is also a correlation between the condition of the motor 12 and a physical condition brought about by the operation of the movable part 11 based on the condition of the controlled object 10. For example, when the movable part 11 is a fan, there is also a correlation between the driving speed of the motor 12 and an air flow rate of the movable part 11 based on the condition of the controlled object 10. Therefore, the second index acquisition unit 142 may acquire the value of the second index associated with the physical condition brought about by the operation of the movable part 11 from a sensor located outside the power conversion device 100.

For example, the second index acquisition unit 142 acquires, from a sensor located outside the power conversion device 100, the air flow rate of the fan that is the movable part 11, a liquid flow rate of a pump that is the movable part 11, or a pressure of the pump that is the movable part 11, or may acquire a temperature of an object to be cooled by the fan or the pump from a sensor located outside the power conversion device 100.

The upper limit data acquisition unit 143, the lower limit data acquisition unit 144, the base data acquisition unit 146, and the width data acquisition unit 147 are used in the above-described manual mode or hybrid mode.

The upper limit data acquisition unit 143 acquires an upper limit input (user input combination) specifying a combination of a value of the first index and an upper limit value of the second index. The upper limit input is input by the user.

The lower limit data acquisition unit 144 acquires a lower limit input (user input combination) specifying a combination of a value of the first index and a lower limit value of a second index. The lower limit input is input by the user.

The base data acquisition unit 146 acquires a base input (user input combination) corresponding to a combination of a value of the first index and a base value of the second index correlated with the value of the first index. The base input is input by the user.

The width data acquisition unit 147 acquires a width input (user input combination) specifying a combination of a value of the first index and a width of the correlation profile (a width in a fluctuation direction of the second index). The width input is input by the user. The width data acquisition unit 147 may acquire data specifying a difference between the upper limit value and the lower limit value of the second index as the width input, or may separately acquire data specifying a difference between the upper limit value and the base value of the second index and data specifying a difference between the base value and the lower limit value of the second index.

The scan control unit 148 and the data storage unit 145 are used in the above-described hybrid mode or auto mode.

The scan control unit 148 controls the power conversion unit 110 to cause the power conversion unit 110 to generate AC power so as to change the first index and provide the AC power to the motor 12 (hereinafter, referred to as "scan control").

The data storage unit 145 stores a set of log data of combination of a value of the first index and a value of the second index. The data storage unit 145 stores log data under the scan control as one set (hereinafter, referred to as "scan data"). Hereinafter, one set of scan data is referred to as a "scan data set".

The base setting unit 149 is used in the manual mode or the hybrid mode. The base setting unit 149 sets a baseline representing a change in the base value of the second index in response to a change in the first index.

In the manual mode, the base setting unit 149 bridges gaps (interpolates a point sequence or functionalizes a relation) between a plurality of base inputs acquired by the base data acquisition unit 146 with a point sequence or a function. For example, the base setting unit 149 may convert each of the gaps between the plurality of base inputs into a function such as a linear function, a polynomial function, or a spline function, or may bridge the gaps between the plurality of base inputs with a point sequence based on one of these functions.

Further, the base setting unit 149 may extrapolate a range beyond the plurality of base inputs using a function such as a linear function, a polynomial function, or a spline function. Extrapolation refers to a process of extending a function within the range of the plurality of base inputs and applying the extended function or interpolating a point sequence using the expanded function. Further, the base setting unit 149 may set, to the range beyond the plurality of base inputs, the base value as a constant value (hereinafter, referred to as "apply a fixed value"). Furthermore, the base setting unit 149 may exclude the range beyond the plurality of base inputs from abnormality determination (hereinafter, referred to as "mask").

In the hybrid mode, the base setting unit 149 sets the baseline based on the scan data set stored in the data storage unit 145. The base setting unit 149 may use one scan data set as the baseline data, or may convert one scan data set into a function such as a linear function, a polynomial function, or a spline function and use the function as the baseline data. Further, the base setting unit 149 may set one baseline that result from taking the average of a plurality of scan data sets. The upper limit setting unit 151 and the lower limit setting unit 152 are used in the manual mode, the auto mode, or the hybrid mode. The upper limit setting unit 151 sets the upper limit of the correlation profile. The lower limit setting unit 152 sets the lower limit of the correlation profile.

The upper limit setting unit 151 and the lower limit setting unit 152 may be configured to set the upper limit and the lower limit so that the width of the correlation profile in the fluctuation direction of the second index varies depending on the first index. In other words, the upper limit setting unit 151 and the lower limit setting unit 152 may set the upper limit and the lower limit so that a width of a correlation profile for a predetermined first index and a width of correlation profile for a first index different from the predetermined first index differs from each other.

In the manual mode, the upper limit setting unit 151 sets the upper limit of the correlation profile by bridging gaps between a plurality of the upper limit inputs acquired by the upper limit data acquisition unit 143 with a point sequence or a function. For example, the upper limit setting unit 151 may convert each of the gaps between the plurality of upper limit inputs into a function such as a linear function, a polynomial function, or a spline function, or may bridge the gaps between the plurality of upper limit inputs with a point sequence based on one of these functions. As in the base setting unit 149, the upper limit setting unit 151 may extrapolate, apply a fixed value to, or mask a range beyond the plurality of upper limit inputs.

The lower limit setting unit 152 sets the lower limit of the correlation profile by bridging gaps between a plurality of the lower limit inputs acquired by the lower limit data acquisition unit 144 with a point sequence or a function. For example, the lower limit setting unit 152 may convert each of the gaps between the plurality of lower limit inputs into a function such as a linear function, a polynomial function, or a spline function, or may bridge the gaps between the plurality of lower limit inputs with a point sequence based on one of these functions. As in the base setting unit 149, the lower limit setting unit 152 may extrapolate, apply a fixed value to, or mask a range beyond the plurality of lower limit inputs.

In the auto mode, the upper limit setting unit 151 sets the upper limit of the correlation profile based on the log data stored in the data storage unit 145. The lower limit setting unit 152 sets the lower limit of the correlation profile based on the log data stored in the data storage unit 145.

For example, the upper limit setting unit 151 and the lower limit setting unit 152 may respectively set the upper limit and the lower limit of the correlation profile based on a fluctuation among the plurality of pieces of scan data set. More specifically, the upper limit setting unit 151 and the lower limit setting unit 152 obtain a variation (for example, standard deviation) in the second index for each value of first index based on the plurality of scan data sets, and set the upper limit and the lower limit of the correlation profile including the variation.

In the hybrid mode, the upper limit setting unit 151 sets the upper limit of the correlation profile above the baseline set by the base setting unit 149. For example, the upper limit setting unit 151 calculates upper limit values of a plurality of values of the second index based on the baseline and a plurality of the width inputs acquired by the width data acquisition unit 147, and bridges gaps between the upper limits values of the plurality of values of the second index with a point sequence or a function to set the upper limit of the correlation profile. The method for bridging gaps between the upper limit values is identical to the method in the manual mode.

When the width input expresses a difference between the upper limit value and the lower limit value of the second index, the upper limit setting unit 151 calculates the upper limit value of the second index by adding half of the width input to the base value. When the width input is divided into data specifying the difference between the upper limit value and the base value of the second index (hereinafter, referred to as "upper limit side data") and data specifying the difference between the base value and the lower limit value of the second index (hereinafter, referred to as "lower limit side data"), the upper limit setting unit 151 calculates the upper limit value of the second index by adding the upper limit side data to the base value.

The lower limit setting unit 152 sets the lower limit of the correlation profile below the baseline set by the base setting unit 149. For example, the lower limit setting unit 152 calculates lower limit values of the plurality of values of the second index based on the baseline and the plurality of width inputs acquired by the width data acquisition unit 147, and bridges gaps between the lower limit values of the plurality of values of the second index with a point sequence or a function to set the lower limit of the correlation profile. The method for bridging the gaps between the lower limit values is identical to the method in the manual mode.

When the width input expresses the difference between the upper limit value and the lower limit value of the second index, the lower limit setting unit 152 calculates the lower limit value of the second index by subtracting half of the difference from the base value. When the width input is divided into the above-described upper limit side data and lower limit side data, the lower limit setting unit 152 calculates the lower limit value of the second index by subtracting the lower limit side data from the base value.

The determination criterion holding unit 153 stores a criterion used to determine whether there is an abnormality in the controlled object 10. For example, the determination criterion holding unit 153 stores the upper limit of the correlation profile set by the upper limit setting unit 151 and the lower limit of the correlation profile set by the lower limit setting unit 152.

The first determination unit 154 acquires a combination of a value of the first index and a value of the second index from the first index acquisition unit 141 and the second index acquisition unit 142, and determines that there is an abnormality in the controlled object 10 in a case where the combination is outside the range between the upper limit and the lower limit of the correlation profile stored in the determination criterion holding unit 153.

The data transmission and reception unit 155 and the second determination unit 156 are used in the above-described learning mode.

The data transmission and reception unit 155 acquires the combination of a value of the first index and a value of the second index from the first index acquisition unit 141 and the second index acquisition unit 142, and transmits the combination as log data to the server 200 conducting machine-learning (to be described later). Further, the data transmission and reception unit 155 receives, from the server 200, parameter data used to identify a neural network built by the server 200 based on machine-learning using the log data, and writes, into the determination criterion holding unit 153, the parameter data as a determination criterion based on machine-learning.

The second determination unit 156 acquires the combination of a value of the first index and a value of the second index from the first index acquisition unit 141 and the second index acquisition unit 142, and determines, by using the neural network built by the server 200 based on machine-learning, whether there is an abnormality in the controlled object 10 in accordance with the input (input combination) including the combination acquired from the first index acquisition unit 141 and the second index acquisition unit 142. For example, the second determination unit 156 uses the neural network identified by the parameter data stored in the determination criterion holding unit 153 to determine whether there is an abnormality in the controlled object 10 in accordance with the input including the combination.

Note that the server 200 executes processing up to the abnormality determination on the controlled object 10 by using the neural network, and the second determination unit 156 determines whether there is an abnormality in the controlled object 10 based on the determination result from the server 200.

(Second Abnormality Detection Unit)

Figure 3:
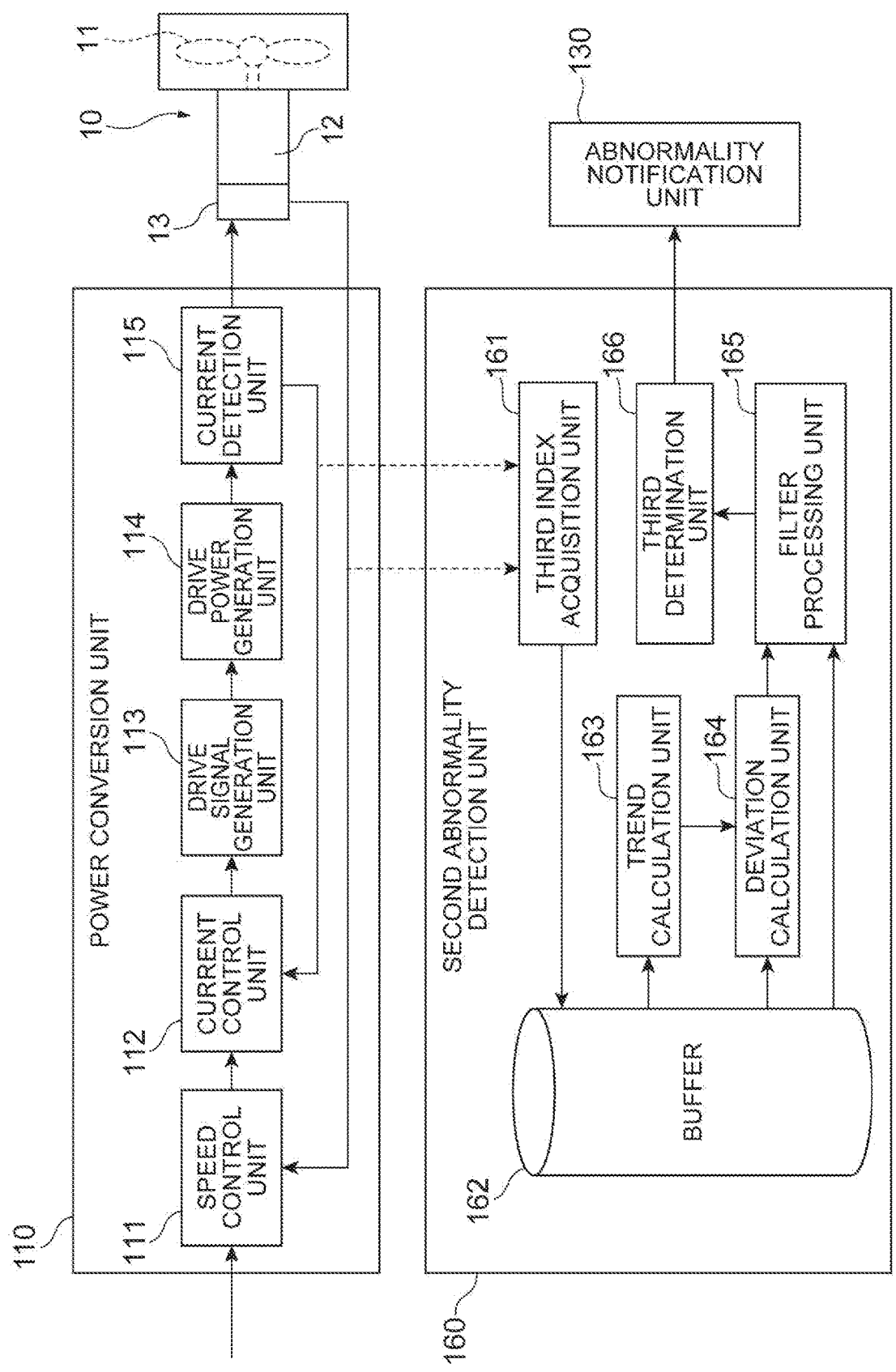
FIG. 3 is a schematic diagram illustrating an example structure of a second abnormality detection unit.

A specific example of the structure of the second abnormality detection unit 160 of the abnormality detection unit 120 will be given with reference to FIG. 3. As shown in FIG. 3, the second abnormality detection unit 160 includes a third index acquisition unit 161, a buffer 162, a trend calculation unit 163, a deviation calculation unit 164, a filter processing unit 165, and a third determination unit 166.

The third index acquisition unit 161 acquires a value of the third index associated with the condition of the motor 12 driving the movable part 11. As with the second index, the third index may be, for example, a detection value of the driving force of the motor 12, or may be a detection value of the driving speed of the motor 12.

For example, the third index acquisition unit 161 acquires the present value fed back from the current detection unit 115 to the current control unit 112 as the detection value associated with the driving force of the motor 12, and acquires the electrical signal fed back from the speed sensor 13 to the speed control unit 111 as the detection value associated with the driving speed of the motor 12.

The third index acquisition unit 161 may acquire the value of the third index from outside the power conversion device 100 through an external input terminal. For example, the third index acquisition unit 161 may acquire the detection value associated with the driving speed or driving force of the motor 12 directly from a sensor located outside the power conversion device 100. Which value is used as the third index is determined by the user.

The third index may be variable depending on the condition of the controlled object 10.

The buffer 162 temporarily stores the latest value of the third index and past values of the third index acquired over a predetermined time period before acquisition of the latest value of the third index.

The trend calculation unit 163 calculates the trend value of the third index from the past values of the third index. The trend value is a value representing a trend of the third index. For example, the trend calculation unit 163 calculates the trend value by applying, to the latest value of the third index in the buffer 162, low-pass filtering based on the past values of the third index.

A specific example of low-pass filtering is finite impulse response filtering. When finite impulse response first-order filtering is used, the trend value is derived from the following equation:

$$Y = A \cdot X[k] + (1-A) \cdot X[k-1] \qquad (1)$$

Y: Trend value
X[k]: Latest value of third index
X[k−1]: Value of third index obtained immediately before
A: Filter Coefficient When finite impulse response second-order filtering is used, the trend value is derived from the following equation:

$$Y = A \cdot X[k] + B \cdot X[k-1] + (1-A-B) \cdot X[k-2] \qquad (2)$$

Y: Trend value
X[k]: Latest value of third index
X[k−1]: Value of third index obtained immediately before
X[k−2]: Value of third index obtained two times before
A, B: Filter coefficient The deviation calculation unit 164 calculates a deviation that is a difference between the latest value of the third index in the buffer 162 and the trend value.

The filter processing unit 165 applies, to the latest deviation in the buffer 162, low-pass filtering based on past deviations in the buffer 162. Specific examples of the low-pass filtering include finite impulse response filtering given as an example in the above equations (1) and (2).

The third determination unit 166 determines whether there is an abnormality in the controlled object 10 based on a magnitude of the deviation. For example, the third determination unit 166 determines whether there is an abnormality in the controlled object based on the deviation to which the filtering has been applied by the filter processing unit 165. More specifically, the third determination unit 166 determines that there is an abnormality in the controlled object 10 when the deviation to which the filtering has been applied by the filter processing unit 165 is greater than a preset threshold.

(2) Server

As described above, the server 200 is used in abnormality detection in the learning mode by the first abnormality detection unit 140. As shown in FIG. 2, the server 200 includes a data storage unit 210, a model building unit 220, and a data transmission unit 230.

The data storage unit 210 receives, from the data transmission and reception unit 155 of the power conversion device 100, the log data of the combination of a value of the first index and a value of the second index and stores the log data.

The model building unit 220 builds, based on machine-learning using the log data stored in the data storage unit 210, a neural network that detects an abnormality in the controlled object 10 in accordance with the input including the combination of a value of the first index and a value of the second index. For example, the model building unit 220 builds the neural network based on so-called deep learning.

The model building unit 220 may be configured to use the neural network thus built to determine whether there is an abnormality in the controlled object 10 in accordance with the input including the combination of a value of the first index and a value of the second index.

The data transmission unit 230 transmits, to the data transmission and reception unit 155 of the power conversion device 100, data used to determine whether there is an abnormality in the controlled object 10 in accordance with the input including the combination of a value of the first index and a value of the second index. For example, the data transmission unit 230 transmits the parameter data used to identify the neural network built by the model building unit 220 to the data transmission and reception unit 155.

When the model building unit 220 is also responsible for determining whether there is an abnormality in the controlled object 10, the data transmission unit 230 may transmit the determination result from the model building unit 220 to the data transmission and reception unit 155.

(3) Hardware Structures of Power Conversion Device and Server

Figure 4:
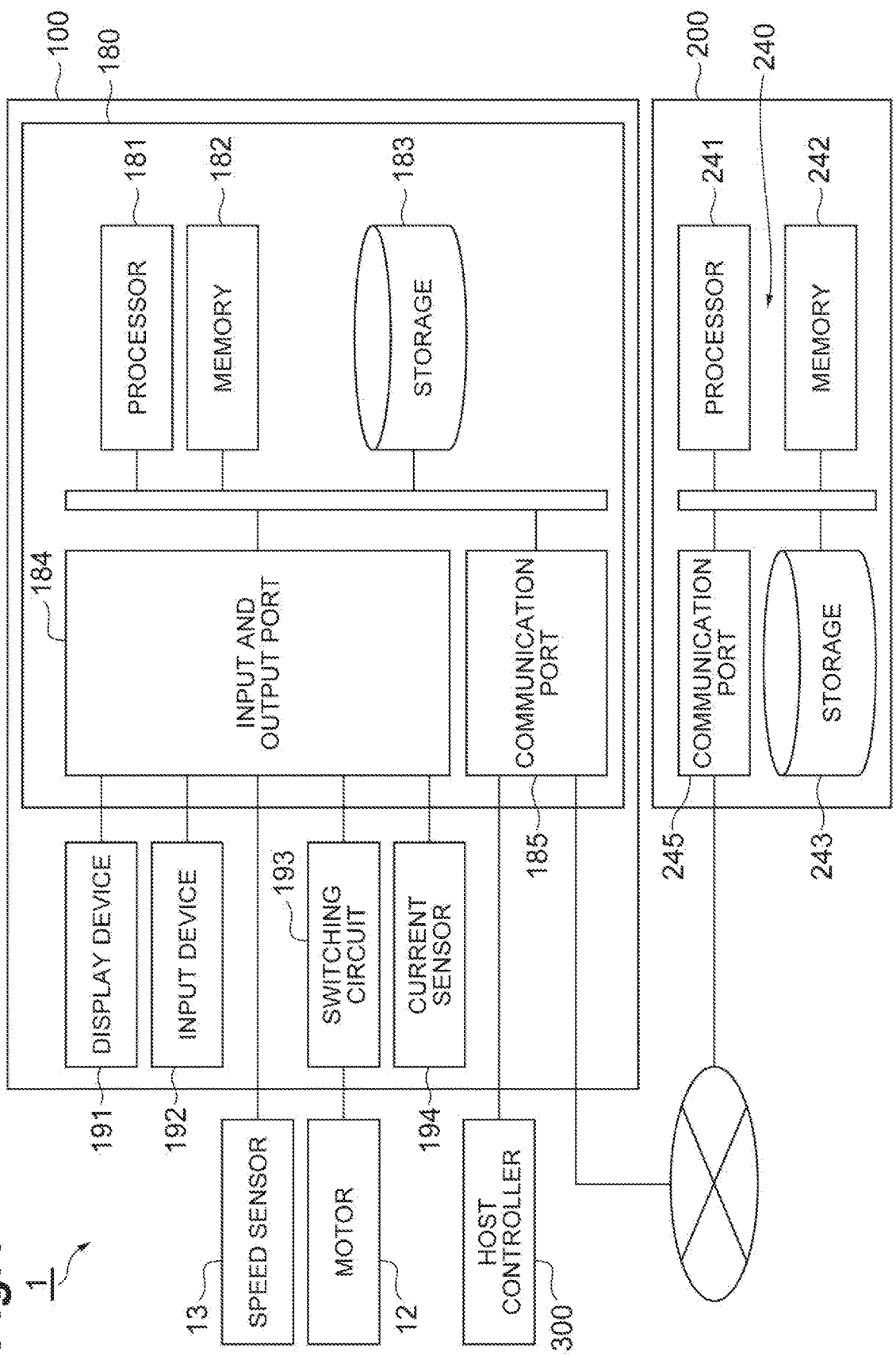
FIG. 4 is a diagram illustrating example hardware structures of a power conversion device and a server.

Examples of hardware structures of the power conversion device 100 and the server 200 will be given with reference to FIG. 4. As shown in FIG. 4, the power conversion device 100 includes a control circuit 180, a display device 191, an input device 192, a switching circuit 193, and a current sensor 194.

The control circuit 180 includes at least one processor 181, a memory 182, a storage 183, an input and output port 184, and a communication port 185.

The storage 183 includes a computer-readable storage medium such as a nonvolatile semiconductor memory. The storage medium stores a program that implements various functions of the power conversion device 100. The memory 182 temporarily stores the program loaded from the storage medium of the storage 183 and a computation result from the processor 181. The processor 181 executes the program in cooperation with the memory 182 to put each of the functions of the power conversion device 100 into operation. The input and output port 184 inputs and outputs an electrical signal from and to the display device 191, the input device 192, the switching circuit 193, and the current sensor 194 in accordance with a command from the processor 181. The communication port 185 communicates information with the server 200 and the host controller 300 in accordance with a command from the processor 181.

Note that the control circuit 180 need not be necessarily configured to implement each of the functions via such a program. For example, the control circuit 180 may implement at least some of the functions with a dedicated logic circuit or an application specific integrated circuit (ASIC) in which such logic circuits are integrated.

The display device 191 and the input device 192 function as user interfaces of the power conversion device 100. The display device 191 includes, for example, a liquid crystal monitor and is used to present information to the user. The input device 192 is, for example, a keypad and receives information input by the user. The display device 191 and the input device 192 may be integrated with each other into a so-called touch panel.

The switching circuit 193 operates in accordance with a command from the control circuit 180 and functions as the drive power generation unit 114 described above. The switching circuit 193 switches connections of positive and negative poles of the DC bus to output line by using a plurality of switching elements to generate AC voltage to be output to the motor 12.

The current sensor 194 functions as the current detection unit 115 described above. The current sensor 194 detects the output current passing from the switching circuit 193 to the motor 12. The output current detected by the current sensor 194 is used as the detection result of the current detection unit 115 in the control circuit 180.

The server 200 includes a circuit 240. The circuit 240 includes at least one processor 241, a memory 242, a storage 243, and a communication port 245.

The storage 243 includes a computer-readable storage medium such as a hard disk. The storage medium stores a program that implements various functions of the server 200. The memory 242 temporarily stores the program loaded from the storage medium of the storage 243 and a computation result from the processor 241. The processor 241 executes the program in cooperation with the memory 242 to put each of the functions of the server 200 into operation. The communication port 245 communicates information with the power conversion device 100 in accordance with a command from the processor 241.

Note that the circuit 240 need not be necessarily configured to implement each of the functions via such a program. For example, the circuit 240 may implement at least some of the functions with a dedicated logic circuit or an application specific integrated circuit (ASIC) in which such logic circuits are integrated.

2. Abnormality Detection Procedure

Next, a specific example will be given of the abnormality detection procedure for the controlled object 10 to be executed by the power conversion device 100.

(1) Abnormality Detection Procedure by First Abnormality Detection Unit

As described above, the first abnormality detection unit 140 is configured to detect an abnormality in the controlled object 10 in any one of four modes: the manual mode, the auto mode, the hybrid mode, and the learning mode. An example will be given below of the abnormality detection procedure in each of the modes.

(Manual Mode)

Figure 5:
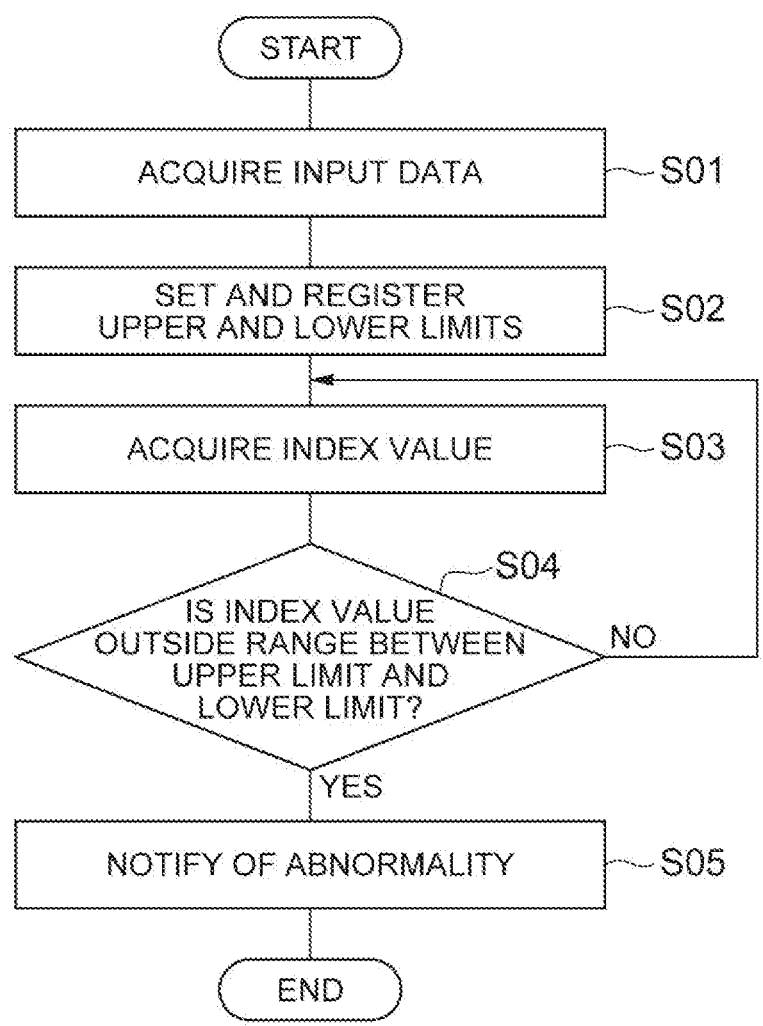
FIG. 5 is a flowchart illustrating an example abnormality detection procedure in a manual mode in the first abnormality detection unit.

As shown in FIG. 5, the first abnormality detection unit 140 first executes operation S01. In operation S01, the base data acquisition unit 146 acquires a plurality of the base inputs, the upper limit data acquisition unit 143 acquires a plurality of the upper limit inputs, and the lower limit data acquisition unit 144 acquires a plurality of the lower limit inputs. For example, the base data acquisition unit 146, the upper limit data acquisition unit 143, and the lower limit data acquisition unit 144 acquire a set of the base input, the upper limit input, and the lower limit input for each of the plurality of values of the first index.

In operation S02, the base setting unit 149 sets the baseline, the upper limit setting unit 151 sets the upper limit of the correlation profile, and the lower limit setting unit 152 sets the lower limit of the correlation profile.

The base setting unit 149 sets the baseline by bridging gaps between the plurality of base inputs acquired in operation S01 with a point sequence or a function.

The upper limit setting unit 151 sets the upper limit of the correlation profile by bridging gaps between the plurality of upper limit inputs acquired in operation S01 with a point sequence or a function, and writes the upper limit of the correlation profile into the determination criterion holding unit 153.

The lower limit setting unit 152 sets the lower limit of the correlation profile by bridging gaps between the plurality of lower limit inputs acquired in operation S01 with a point sequence or a function, and writes the lower limit of the correlation profile into the determination criterion holding unit 153.

Next, the first abnormality detection unit 140 executes operation S03. In operation S03, the first index acquisition unit 141 acquires a value of the first index, and the second index acquisition unit 142 acquires a value of the second index correlated with the value of the first index.

Next, the first abnormality detection unit 140 executes operation S04. In operation S04, the first determination unit 154 determines whether the combination of the value of the first index and the value of the second index acquired in operation S03 is outside the range between the upper limit and the lower limit of the correlation profile.

When a determination is made in operation S04 that the combination of the value of the first index and the value of the second index is within the range between the upper limit and the lower limit of the correlation profile, the first abnormality detection unit 140 returns the processing to operation S03. Subsequently, until a determination is made that the combination of the value of the first index and the value of the second index is outside the range between the upper limit and the lower limit of the correlation profile, the combination of the value of the first index and the value of the second index is repeatedly acquired and evaluated.

When a determination is made in operation S04 that the combination of the value of the first index and the value of the second index is outside the range between the upper limit and the lower limit of the correlation profile, the first abnormality detection unit 140 and the abnormality notification unit 130 execute operation S05. In operation S05, the first determination unit 154 determines that there is an abnormality in the controlled object 10, and the abnormality notification unit 130 notifies the host controller 300 of the determination result. Then, the abnormality detection for the controlled object 10 is brought to an end.

Figure 6:
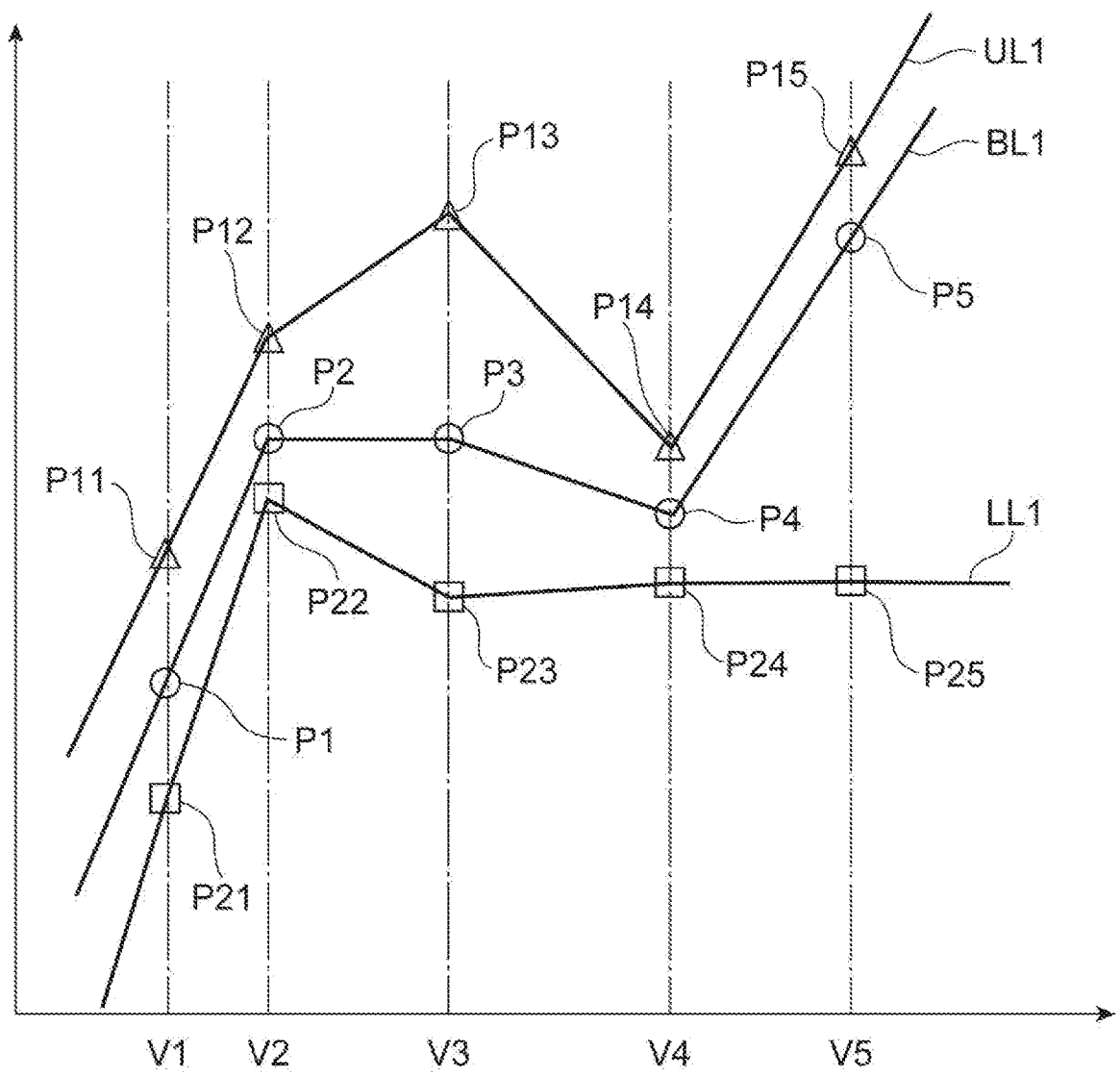
FIG. 6 is a graph illustrating setting examples of a baseline, an upper limit, and a lower limit of a correlation profile.

FIG. 6 is a graph illustrating setting examples of an abnormality determination criterion in the manual mode, in which the horizontal axis represents the magnitude of the first index, and the vertical axis represents the magnitude of the second index. In the example shown in FIG. 6, a base value P1, an upper limit value P11, and a lower limit value P21 are acquired for a value V1 of the first index. A base value P2, an upper limit value P12, a lower limit value P22 are acquired for a value V2 of the first index. A base value P3, an upper limit value P13, and a lower limit value P23 are acquired for a value V3 of the first index. A base value P4, an upper limit value P14, and a lower limit value P24 are acquired for a value V4 of the first index. A base value P5, an upper limit value P15, and a lower limit value P25 are acquired for a value V5 of the first index value.

A baseline BL1 results from converting ranges between the base values P1, P2, P3, P4, and P5 into linear functions and extending the linear functions outward from the range between values P1 and P5. For example the function between the base values P1 and P2 is extended outward over the base value P1 and the function between the base values P4 and P5 is extended outward over the base value P5. An upper limit UL1 results from converting ranges between the upper limit values P11, P12, P13, P14, and P15 into linear functions outward from the range between values P11 and P15. For example the function between the base values P11 and P12 is extended outward over the base value P11 and the function between the base values P14 and P15 is extended outward over the base value P15. A lower limit LL1 results from converting ranges between the lower limit values P21, P22, P23, P24, and P25 into linear functions and extending the linear functions outward from the range between values P21 and P25. For example the function between the base values P21 and P22 is extended outward over the base value P21 and the function between the base values P24 and P25 is extended outward over the base value P25.

As shown in FIG. 6, the base value, the upper limit value, and the lower limit value can be set for each value of the first index, so that the upper limit and the lower limit can be set so that the width of the correlation profile in the fluctuation direction of the second index varies depending on the first index.

Note that FIG. 6 shows a case where the upper limit and the lower limit of the correlation profile are set only for the first quadrant where both the first index and the second index are positive values, but the upper limit and the lower limit of the correlation profile can be set for the other quadrants. By setting the upper limit and the lower limit of the correlation profile for the quadrants other than the first quadrant, an abnormality in the controlled object 10 may be detected both in power running operation and in regenerative operation.

(Auto Mode)

Figure 7:
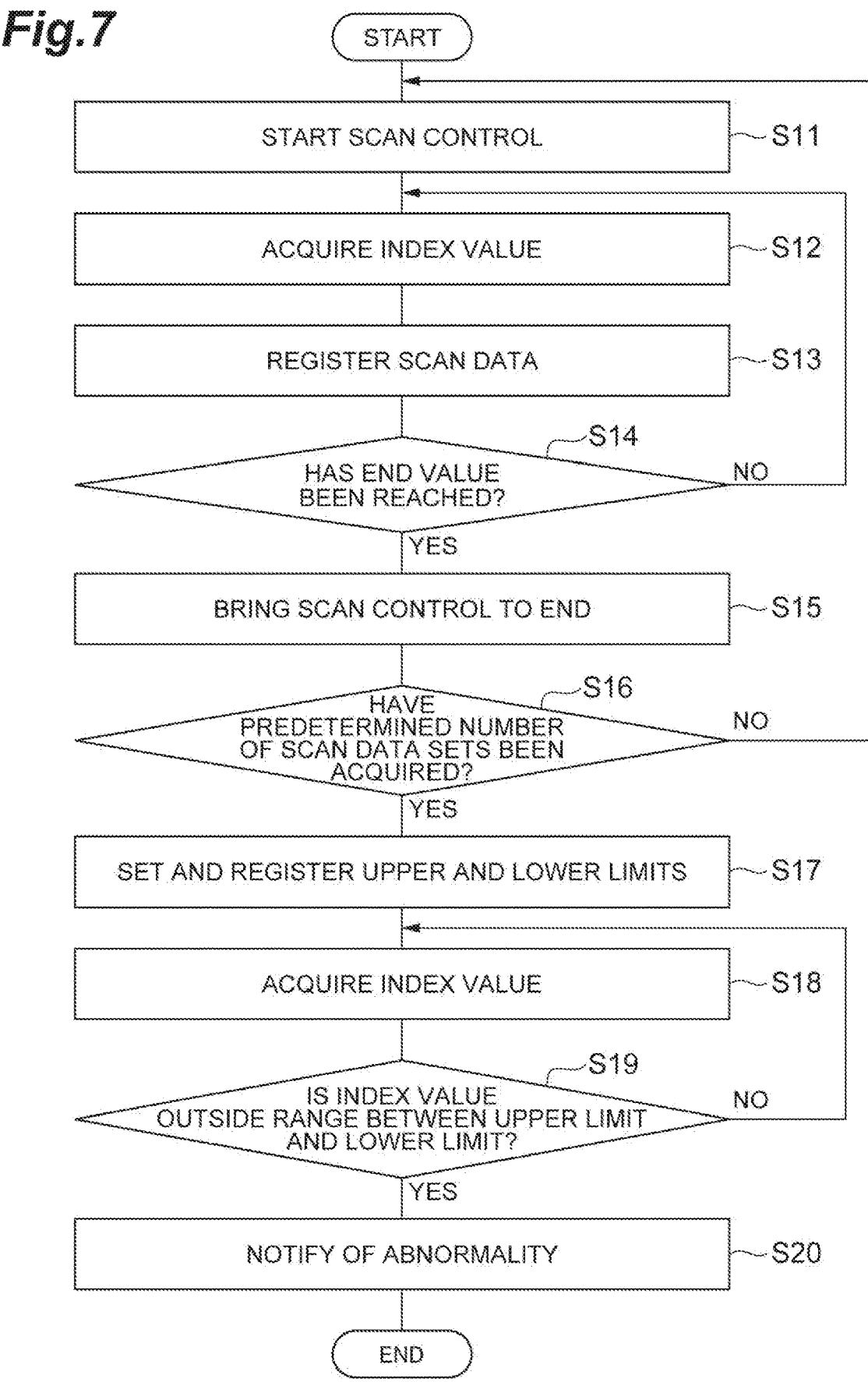
FIG. 7 is a flowchart illustrating an example abnormality detection procedure in an auto mode.

As shown in FIG. 7, the first abnormality detection unit 140 first executes operation S11. In operation S11, the scan control unit 148 starts the scan control (controls the power conversion unit 110 to cause the power conversion unit 110 to generate AC power so as to change the first index and provide the AC power to the motor 12). For each scan control, a range in which the first index is changed (hereinafter, referred to as "scan range") is preset in consideration of an actual use environment.

Next, the first abnormality detection unit 140 executes operation S12. In operation S12, the first index acquisition unit 141 acquires a value of the first index, and the second index acquisition unit 142 acquires a value of the second index value correlated with the value of the first index.

Next, the first abnormality detection unit 140 executes operation S13. In operation S13, the first index acquisition unit 141 and the second index acquisition unit 142 write, into the data storage unit 145, the combination data of the value of the first index and the value of the second index acquired in operation S12 with the combination data and the currently running scan control associated with each other.

Next, the first abnormality detection unit 140 executes operation S14. In operation S14, the scan control unit 148 confirms whether the value of the first index has reached an end value of the scan control (for example, an end of the scan range).

When a determination is made in operation S14 that the value of the first index has not reached the end value of the scan control, the first abnormality detection unit 140 returns the processing to operation S12. Subsequently, until the value of the first index has reached the end value of scan control, the combination data associated with the scan control is repeatedly stored. Accordingly, one scan data set is stored in the data storage unit 145.

When a determination is made in operation S14 that the value of the first index has reached the end value of the scan control, the first abnormality detection unit 140 executes operation S15. In operation S15, the scan control unit 148 brings the scan control to an end.

Next, the first abnormality detection unit 140 executes operation S16. In operation S16, the scan control unit 148 confirms whether a predetermined number of scan data sets have been acquired. The predetermined number is preset so as to enable setting of the upper limit and the lower limit of the correlation profile.

When a determination is made in operation S16 that the predetermined number of scan data sets have not been acquired yet, the first abnormality detection unit 140 returns the processing to operation S11. Subsequently, until the predetermined number of scan data sets have been acquired, a scan data set is repeatedly stored.

When a determination is made in operation S16 that the predetermined number of scan data sets have been acquired, the first abnormality detection unit 140 executes operation S17. In operation S17, the upper limit setting unit 151 sets the upper limit of the correlation profile, and the lower limit setting unit 152 sets the lower limit of the correlation profile.

The upper limit setting unit 151 and the lower limit setting unit 152 respectively set the upper limit and the lower limit of the correlation profile based on the log data stored in the data storage unit 145. For example, the upper limit setting unit 151 and the lower limit setting unit 152 respectively set the upper limit and the lower limit of the correlation profile based on the fluctuation among the plurality of scan data sets and write the upper limit and the lower limit into the determination criterion holding unit 153.

As a result, the upper limit and the lower limit of the correlation profile in the auto mode have been set. Subsequent operations S18, S19, and S20 are identical to operations S03, S04, and S05 described above.

(Hybrid Mode)

Figure 8:
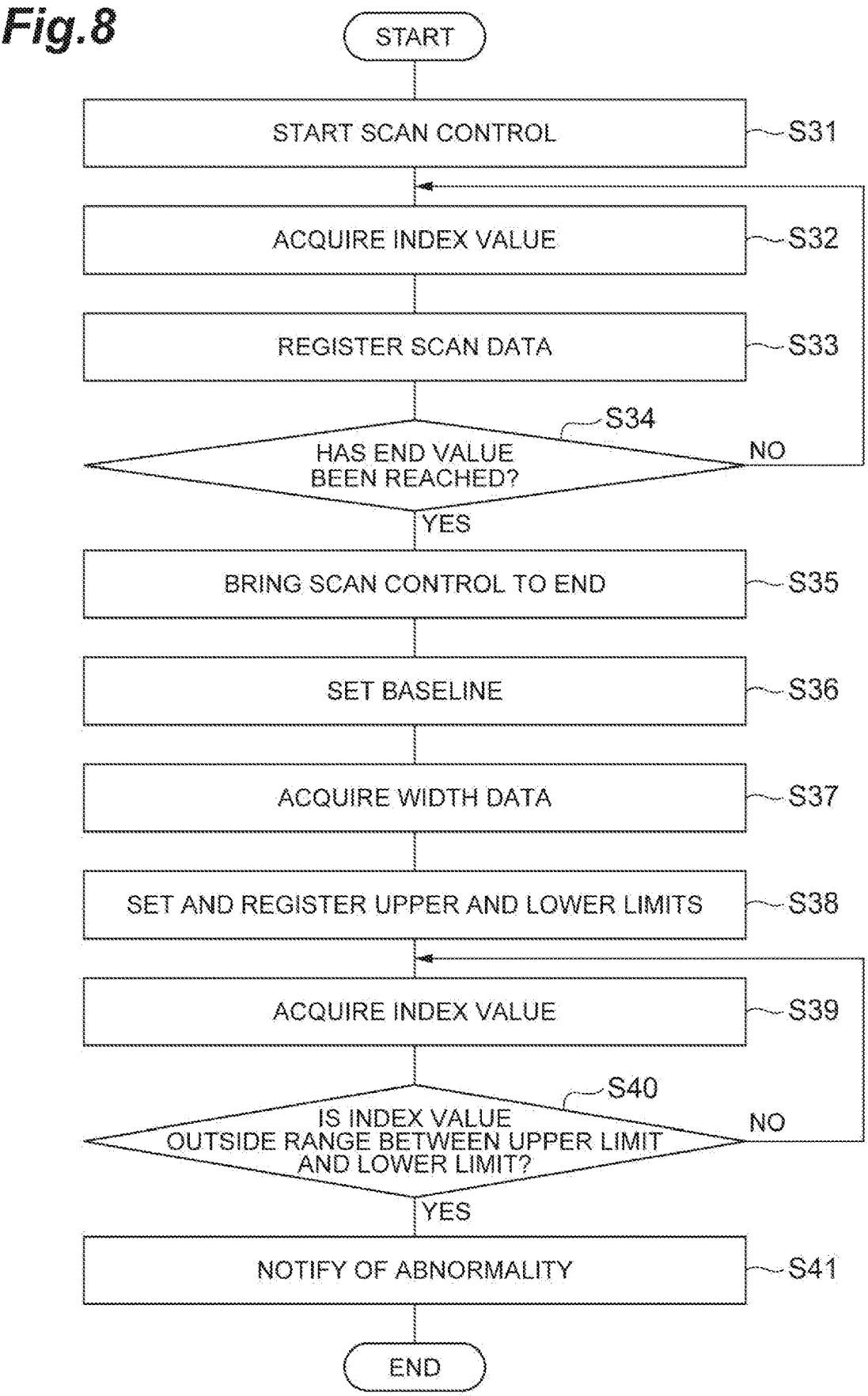
FIG. 8 is a flowchart illustrating an example abnormality detection procedure in a hybrid mode.

As shown in FIG. 8, the first abnormality detection unit 140 first executes operations S31, S32, S33, S34, and S35 identical to operations S11, S12, S13, S14, and S15 described above, and stores one scan data set in the data storage unit 145. Note that the first abnormality detection unit 140 may store a plurality of scan data sets in the data storage unit 145 by repeating operations S31, S32, S33, S34, and S35.

Next, the first abnormality detection unit 140 executes operation S36. In operation S36, the base setting unit 149 sets the baseline. The base setting unit 149 sets the baseline based on the scan data set stored in operations S31, S32, S33, S34, and S35.

Next, the first abnormality detection unit 140 executes operation S37. In operation S37, the width data acquisition unit 147 acquires the width input specifying a value of the first index and the width of the correlation profile for the value of the first index.

Next, the first abnormality detection unit 140 executes operation S38. In operation S38, the upper limit setting unit 151 sets the upper limit of the correlation profile above the baseline, and the lower limit setting unit 152 sets the lower limit of the correlation profile below the baseline.

The upper limit setting unit 151 calculates upper limit values of second index based on the baseline and the plurality of width inputs, sets the upper limit of the correlation profile by bridging gaps between the upper limit values of second index with a point sequence or a function, and writes the upper limit into the determination criterion holding unit 153.

The lower limit setting unit 152 calculates lower limit values of second index based on the baseline and the plurality of width inputs, sets the lower limit of the correlation profile by bridging gaps between the lower limit values of second index with a point sequence or a function, and writes the lower limit into the determination criterion holding unit 153.

As a result, the upper limit and the lower limit of the correlation profile in the hybrid mode have been set. Subsequent operations S39, S40, and S41 are identical to operations S03, S04, and S05 described above.

(Learning Mode)

Figure 9:
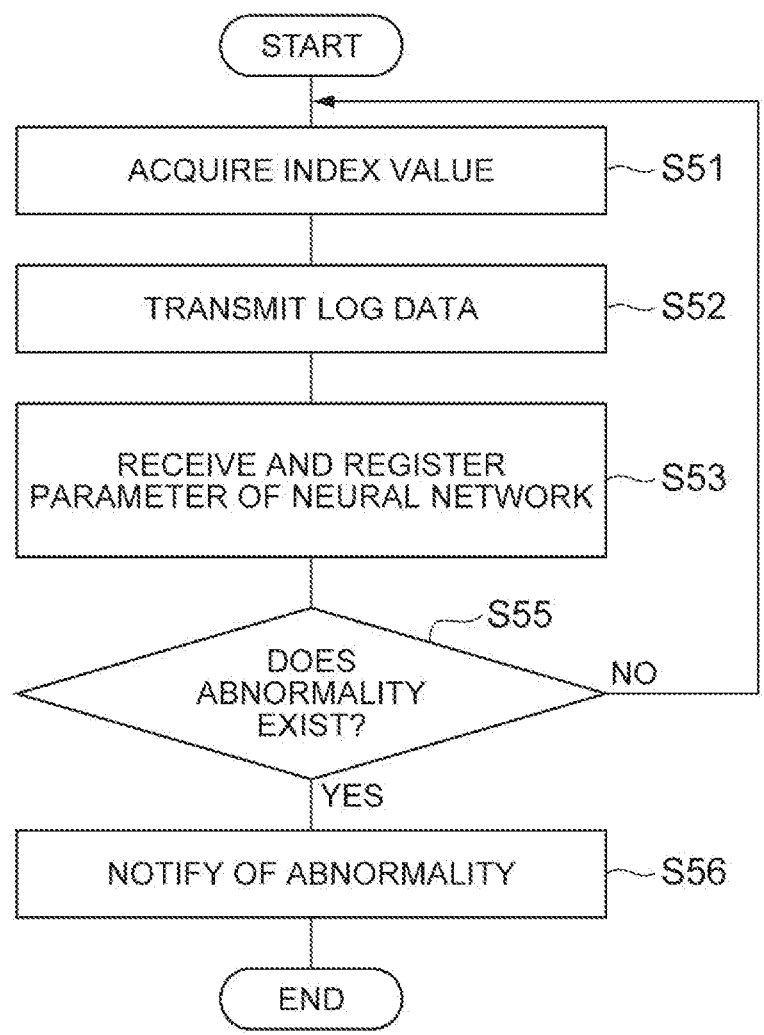
FIG. 9 is a flowchart illustrating an example abnormality detection procedure in a learning mode.

As shown in FIG. 9, the first abnormality detection unit 140 first executes operation S51. In operation S51, the first index acquisition unit 141 acquires a value of the first index, and the second index acquisition unit 142 acquires a value of the second index correlated with the value of the first index.

Next, the first abnormality detection unit 140 executes operation S52. In operation S52, the data transmission and reception unit 155 transmits the log data of the combination of the value of the first index and the value of the second index correlated with the value of the first index to the data storage unit 210 of the server 200.

Next, the first abnormality detection unit 140 executes operation S53. In operation S53, the data transmission and reception unit 155 receives, from the data transmission unit 230 of the server 200, parameter data used to identify the latest neural network built by the server 200, and writes the parameter data into the determination criterion holding unit 153.

Next, the first abnormality detection unit 140 executes operation S55. In operation S55, the second determination unit 156 determines, by using the neural network identified by the parameter data stored in the determination criterion holding unit 153, whether there is an abnormality in the controlled object 10 in accordance with an input including the combination of the value of the first index and the value of the second index acquired in operation S51.

When the determination result in operation S55 is "there is no abnormality", the first abnormality detection unit 140 returns the processing to operation S51. Subsequently, until the determination result in operation S55 is "abnormality exists", the abnormality determination for the controlled object 10 by using the neural network built by the server 200 is repeated.

When the determination result in operation S55 is "abnormality exists", the abnormality notification unit 130 executes operation S56. In operation S56, the abnormality notification unit 130 notifies the host controller 300 of the determination that there is an abnormality in the controlled object 10. Then, the abnormality detection for the controlled object 10 is brought to an end.

Figure 10:
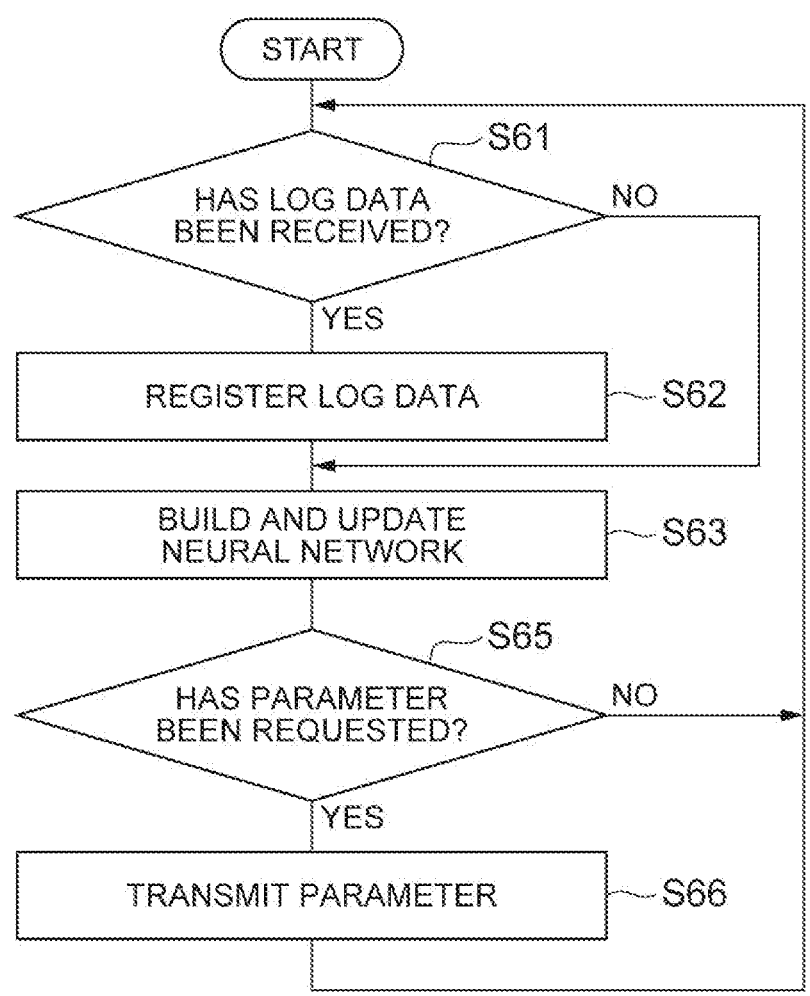
FIG. 10 is a flowchart illustrating an example machine-learning procedure in the server.

FIG. 10 is a flowchart illustrating an example of learning process in the server 200. As shown in FIG. 10, the server 200 first executes operation S61. In operation S61, the data storage unit 210 confirms whether the log data of the value of the first index and the value of the second index has been transmitted from the data transmission and reception unit 155 of the power conversion device 100.

When a determination is made in operation S61 that the log data of the value of the first index and the value of the second index has been transmitted from the data transmission and reception unit 155, the server 200 executes operation S62. In operation S62, the data storage unit 210 stores the log data transmitted from the data transmission and reception unit 155.

Next, the server 200 executes operation S63. When a determination is made in operation S61 that the log data has not been transmitted from the data transmission and reception unit 155, the server 200 executes operation S63 without executing operation S62. In operation S63, the model building unit 220 builds, based on machine-learning using the log data stored in the data storage unit 210, a neural network that detects an abnormality in the controlled object 10 in accordance with an input including the combination of the value of the first index and the value of the second index. For example, the model building unit 220 builds or updates the neural network based on so-called deep learning.

Next, the server 200 executes operation S65. In operation S65, the data transmission unit 230 confirms whether the data transmission and reception unit 155 of the power conversion device 100 has requested transmission of parameter data of the neural network.

In operation S65, when a determination is made that the data transmission and reception unit 155 has requested the transmission of the parameter data, the server 200 executes operation S66. In operation S66, the data transmission unit 230 transmits parameter data used to identify the latest neural network to the data transmission and reception unit 155 of the power conversion device 100.

Subsequently, the server 200 returns the processing to operation S61. When a determination is made in operation S65 that the data transmission and reception unit 155 has not requested transmission of parameter data, the server 200 returns the processing to operation S61 without executing operation S66. Subsequently, the neural network is repeatedly updated based on machine-learning while continuing transmission and reception of data to and from the power conversion device 100.

As described above, the server 200 repeatedly acquires, from the power conversion device 100, a set of log data of a combination of a value of the first index and a value of the second index and stores the log data, and generates, by machine-learning based on the log data thus stored, data for detecting an abnormality of the controlled object 10 in accordance with the input including the combination of the value of the first index and the value of the second index value.

The data used to detect an abnormality in the controlled object 10 is, for example, parameter data used to identify the neural network described above. When the model building unit 220 is also in charge of determining whether there is an abnormality in the controlled object 10, the data used to detect an abnormality in the controlled object 10 may be data representing the determination result from the model building unit 220.

(2) Abnormality Detection Procedure by Second Abnormality Detection Unit

Figure 11:
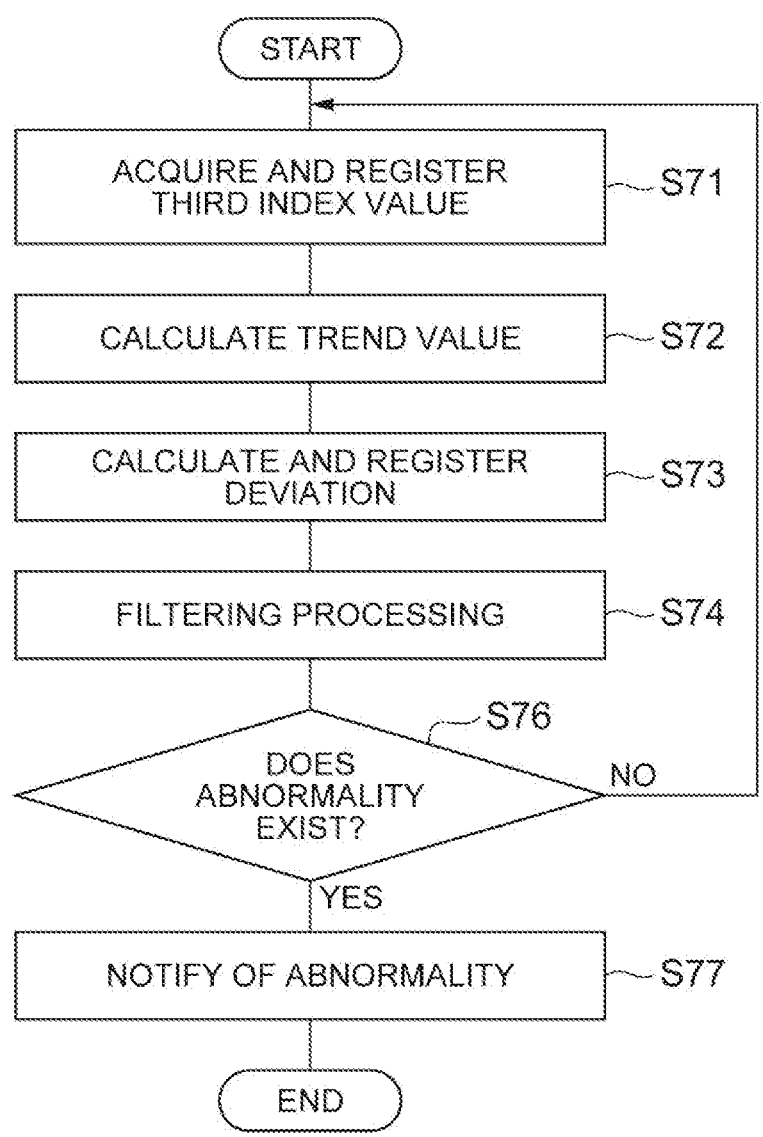
FIG. 11 is a flowchart illustrating an example abnormality detection procedure in the second abnormality detection unit.

As shown in FIG. 11, the second abnormality detection unit 160 first executes operation S71. In operation S71, the third index acquisition unit 161 acquires a value of the third index and writes the value of the third index into the buffer 162.

Next, the second abnormality detection unit 160 executes operation S72. In operation S72, the trend calculation unit 163 calculates the trend value of the third index from past values of the third index. For example, the trend calculation unit 163 applies, to the latest value of the third index in the buffer 162, low-pass filtering based on the past values of the third index in the buffer 162 to calculate the trend value.

Next, the second abnormality detection unit 160 executes operation S73. In operation S73, the deviation calculation unit 164 calculates the deviation that is the difference between the latest value of the third index in the buffer 162 and the trend value and writes the deviation into the buffer 162.

Next, the second abnormality detection unit 160 executes operation S74. In operation S74, the filter processing unit 165 applies, to the latest deviation in the buffer 162, low-pass filtering based on past deviations in the buffer 162.

Next, the second abnormality detection unit 160 executes operation S76. In operation S76, the third determination unit 166 determines whether there is an abnormality in the controlled object based on the deviation to which filtering has been applied by the filter processing unit 165.

When the determination result in operation S76 is "there is no abnormality", the second abnormality detection unit 160 returns the processing to operation S71. Subsequently, until the determination result in operation S76 is "abnormality exists", the acquisition of the value of the third index and the abnormality determination are repeated.

When the determination result in operation S76 is "abnormality exists", the abnormality notification unit 130 executes operation S77. In operation S77, the abnormality notification unit 130 notifies the host controller 300 of the determination that there is an abnormality in the controlled object 10. Then, the abnormality detection for the controlled object 10 is brought to an end.

As described above, the power conversion device 100 includes the power conversion unit 110 configured to generate AC power for driving the controlled object 10 and provide the AC power to the motor 12, and the abnormality detection unit 120 configured to detect an abnormality in the controlled object 10 based on the index associated with the condition of the motor 12 driving the movable part 11.

The power conversion device 100 is capable of detecting an abnormality in the controlled object 10 by effectively using information on the condition of the motor 12 driving the movable part 11. Accordingly, the added value of the power conversion device may be increased.

The abnormality detection unit 120 may include the first abnormality detection unit 140 configured to detect an abnormality in the controlled object 10 based on the relation between the first index and the second index associated with the condition of the motor 12.

Even when there is no abnormality in the controlled object 10, the condition of the motor 12 varies at any time depending on a change in control command. For this reason, even when only a change in one index is captured, it is difficult to determine whether this change occurs in response to a change in control command or an abnormality in the controlled object 10. On the other hand, by focusing on the correlation between the first index and the second index, a change in the second index in response to the change in control command and a change in the second index in response to the abnormality in the controlled object 10 may be separately identified, and the abnormality in the controlled object 10 may be detected with higher reliability.

The first abnormality detection unit 140 may include the upper limit setting unit 151 configured to set the upper limit of the correlation profile representing a change in the second index in response to a change in the first index, the lower limit setting unit 152 configured to set the lower limit of the correlation profile, and the first determination unit 154 configured to determine that there is an abnormality in the controlled object 10 in a case where the combination of a value of the first index value and a value of the second index is outside the range between the upper limit and the lower limit of the correlation profile. In this case, erroneous abnormality detection may be reduced by setting the upper limit and the lower limit of the correlation profile and providing an allowance for the abnormality determination criterion for the controlled object 10.

The upper limit setting unit 151 and the lower limit setting unit 152 may be configured to set the upper limit and the lower limit so that the width of the correlation profile in the fluctuation direction of the second index varies depending on the first index. In this case, an abnormality in the controlled object 10 may be detected with higher reliability by minutely setting the upper limit and the lower limit of the correlation profile in accordance with characteristics of the controlled object 10.

The first abnormality detection unit 140 may further include the upper limit data acquisition unit 143 configured to acquire an upper limit input specifying a combination of a value of the first index and an upper limit value of the second index, and the lower limit data acquisition unit 144 configured to acquire a lower limit input specifying a combination of a value of the first index and a lower limit value of the second index, the upper limit setting unit 151 may set the upper limit of the correlation profile by bridging gaps between the plurality of upper limit inputs acquired by the upper limit data acquisition unit 143 with a point sequence or a function, and the lower limit setting unit 152 may set the lower limit of the correlation profile by bridging gaps between the plurality of lower limit inputs acquired by the lower limit data acquisition unit 144 with a point sequence or a function. This configuration allows the upper limit setting unit 151 to bridge the gaps between the plurality of upper limit inputs and allows the lower limit setting unit 152 to bridge the gaps between the plurality of lower limit inputs, which increases user convenience.

The first abnormality detection unit 140 may further include the data storage unit 145 configured to store a set of the log data of combination of a value of the first index and a value of the second index, the upper limit setting unit 151 may set the upper limit of the correlation profile based on the log data stored in the data storage unit 145, and the lower limit setting unit 152 may set the lower limit of the correlation profile based on the log data stored in the data storage unit 145. This configuration allows the upper limit and the lower limit of the correlation profile to be automatically set based on the log data stored in the data storage unit 145, which further increases user convenience.

The first abnormality detection unit 140 may further include the scan control unit 148 configured to control the power conversion unit 110 to generate AC power so as to change the first index and provide the AC power to the motor 12, the data storage unit 145 may store the log data while the power conversion unit 110 is under control of the scan control unit 148, and the upper limit setting unit 151 and the lower limit setting unit 152 may set the upper limit and the lower limit of the correlation profile based on the fluctuation among at least two sets of the log data. In this case, the log data may be stored intensively, and the upper limit and the lower limit of the correlation profile may be set early.

The first abnormality detection unit 140 may further include the base setting unit 149 configured to set the baseline representing a change in a base value of the second index in response to a change in the first index, the upper limit setting unit 151 may set the upper limit of the correlation profile above the baseline, and the lower limit setting unit 152 may set the lower limit of the correlation profile below the baseline. A standard correlation between the first index and the second index can be grasped early as compared with a correlation profile having a width. Therefore, by setting the standard correlation as the baseline and setting the upper limit and the lower limit of the correlation profile based on the baseline, the upper limit and the lower limit of the correlation profile may be set early with higher reliability.

The first abnormality detection unit 140 may further include the base data acquisition unit 146 configured to acquire the base input corresponding to the combination of a value of the first index and a base value of the second index, and the base setting unit 149 may set the baseline by bridging gaps between the plurality of base inputs acquired by the base data acquisition unit 146 with a point sequence or a function. This configuration allows the base setting unit 149 to bridge the gaps between the plurality of base inputs, which increases user convenience.

The first abnormality detection unit 140 may further include the scan control unit 148 configured to control the power conversion unit 110 to generate AC power so as to change the first index and provide the AC power to the motor 12, the data storage unit 145 configured to store a set of the log data of a combination of a value of the first index and a value of the second index while the power conversion unit 110 is under control of the scan control unit 148, the base setting unit 149 configured to set the baseline representing a change in a base value of the second index in response to a change in the first index based on the log data, and the width data acquisition unit 147 configured to acquire the width input specifying a combination of a value of the first index and a width of the correlation profile, the upper limit setting unit 151 may calculate upper limit values of the second index based on the baseline and the plurality of width inputs and set the upper limit of the correlation profile by bridging gaps between the upper limit values of the second index with a point sequence or a function, and the lower limit setting unit 152 may calculate lower limit values of the second index based on the baseline and the plurality of width inputs and set the lower limit of the correlation profile by bridging gaps between the lower limit values of the second index with a point sequence or a function. This configuration allows the baseline, and the upper limit and the lower limit in accordance with the width specified by the user to be automatically set, which increases user convenience.

The first abnormality detection unit 140 may detect an abnormality in the controlled object 10 in response to an input including a combination of a value of the first index and a value of the second index using a neural network. In this case, the reliability of abnormality detection may be further increased.

The first abnormality detection unit 140 may include the data transmission and reception unit 155 configured to transmit log data of a combination of a value of the first index and a value of the second index to the server 200 for machine-learning, and the second determination unit 156 configured to detect an abnormality in the controlled object 10 in response to an input including a combination of a value of the first index and a value of the second index using a neural network built by the server 200 by machine-learning based on the log data. In this case, the reliability of abnormality detection based on machine-learning may be easily increased by utilizing the server 200 outside the power conversion device 100 as a resource used for machine-learning.

The first index may be a command value or detection value associated with the driving speed of the motor 12, and the second index may be a detection value associated with the driving force of the motor 12. The first index may be a command value or detection value associated with the driving force of the motor 12, and the second index may be a detection value associated with the driving speed of the motor 12. By either of the configurations, the device structure may be simplified by utilizing the information used to control the motor 12 for abnormality detection.

The abnormality detection unit 120 may include the second abnormality detection unit 160 configured to detect an abnormality in the controlled object 10 based on a relation between the third index value associated with a condition of the motor 12 driving the movable part 11 and the trend value derived from past values of the third index acquired during a period from a predetermined time before to a time of acquisition of the value of the third index. The second abnormality detection unit 160 may include the trend calculation unit 163 configured to calculate the trend value based on the past values of the third index, the deviation calculation unit 164 configured to calculate a deviation corresponding to a difference between the value and the trend value of the third index, and the third determination unit 166 configured to determine whether there is an abnormality in the controlled object 10 based on a magnitude of the deviation. In this case, a sudden abnormality such as damage to a power transmission system may be detected with high sensitivity.

When the abnormality detection unit 120 includes both the first abnormality detection unit 140 and the second abnormality detection unit 160, the first abnormality detection unit 140 detects an abnormality that gradually progresses due to, for example, gathered dust, and the second abnormality detection unit 160 detects a sudden abnormality due to, for example, a component failure, thereby making it possible to detect an abnormality in the controlled object 10 with higher sensitivity.

The second abnormality detection unit 160 may further include the filter processing unit 165 configured to apply, to the deviation, low-pass filtering using past values of the deviations, and the third determination unit 166 may determine whether there is an abnormality in the controlled object 10 based on the deviation to which the filtering has been applied by the filter processing unit 165. This configuration allows a noise component of the deviation to be removed by low-pass filtering, in which case such a sudden abnormality may be detected with higher reliability.

The trend calculation unit 163 may calculate the trend value of the third index by applying low-pass filtering using the past values of the third index to a value of the third index. In this case, the trend value may be calculated with a smaller number of pieces of data as compared to statistical processing such as average value calculation.

It is to be understood that not all aspects, advantages and features described herein may necessarily be achieved by, or included in, any one particular example embodiment. Indeed, having described and illustrated various examples herein, it should be apparent that other examples may be modified in arrangement and detail.

We claim all modifications and variations coming within the spirit and scope of the subject matter claimed herein.

Regarding the above embodiments, the following appendices are appended.

(Appendix 1) A power conversion device comprising:

a power conversion unit configured to generate AC power for driving a controlled object including a movable part and a motor configured to drive the movable part and provide the AC power to the motor; and an abnormality detection unit configured to detect an abnormality in the controlled object based on an index associated with a condition of the motor driving the movable part.

(Appendix 2) The power conversion device according to appendix 1, wherein the abnormality detection unit includes a first abnormality detection unit configured to detect an abnormality in the controlled object based on a relation between a first index and a second index associated with the condition of the motor.

(Appendix 3) The power conversion device according to appendix 2, wherein the first abnormality detection unit includes an upper limit setting unit configured to set an upper limit of a correlation profile representing a change in the second index in response to a change in the first index, a lower limit setting unit configured to set a lower limit of the correlation profile, and a first determination unit configured to determine that there is an abnormality in the controlled object in a case where a combination of a value of the first index and a value of the second index is outside a range between the upper limit and the lower limit of the correlation profile.

(Appendix 4) The power conversion device according to appendix 3, wherein the upper limit setting unit and the lower limit setting unit are configured to set the upper limit and the lower limit so that a width of the correlation profile in a fluctuation direction of the second index varies depending on the first index.

(Appendix 5) The power conversion device according to appendix 4, wherein the first abnormality detection unit further includes an upper limit data acquisition unit configured to acquire an upper limit input specifying a combination of a value of the first index and an upper limit value of the second index, and a lower limit data acquisition unit configured to acquire a lower limit inputs specifying a combination of a value of the first index and a lower limit value of the second index, the upper limit setting unit sets the upper limit of the correlation profile by bridging gaps between a plurality of upper limit inputs acquired by the upper limit data acquisition unit with a point sequence or a function, and the lower limit setting unit sets the lower limit of the correlation profile by bridging gaps between a plurality of lower limit inputs acquired by the lower limit data acquisition unit with a point sequence or a function.

(Appendix 6) The power conversion device according to appendix 4, wherein
the first abnormality detection unit further includes
a data storage unit configured to store a set of log data of combination of a value of the first index and a value of the second index,
the upper limit setting unit sets the upper limit of the correlation profile based on the log data stored in the data storage unit, and
the lower limit setting unit sets the lower limit of the correlation profile based on the log data stored in the data storage unit.

(Appendix 7) The power conversion device according to appendix 6, wherein
the first abnormality detection unit further includes
a scan control unit configured to control the power conversion unit to generate AC power so as to change the first index and output the AC power to the motor,
the data storage unit stores the log data while the power conversion unit is under control of the scan control unit, and
the upper limit setting unit and the lower limit setting unit set the upper limit and the lower limit of the correlation profile based on a fluctuation among at least two sets of the log data.

(Appendix 8) The power conversion device according to any one of appendices 3 to 7, wherein
the first abnormality detection unit further includes
a base setting unit configured to set a baseline representing a change in a base value of the second index in response to a change in the first index,
the upper limit setting unit sets the upper limit of the correlation profile above the baseline, and
the lower limit setting unit sets the lower limit of the correlation profile below the baseline.

(Appendix 9) The power conversion device according to appendix 8, wherein
the first abnormality detection unit further includes
a base data acquisition unit configured to acquire base input corresponding to a combination of a value of the first index and a base value of the second index, and
the base setting unit sets the baseline by bridging gaps between a plurality of base inputs acquired by the base data acquisition unit with a point sequence or a function.

(Appendix 10) The power conversion device according to appendix 4, wherein
the first abnormality detection unit further includes
a scan control unit configured to control the power conversion unit to generate AC power so as to change the first index and output the AC power to the motor,
a data storage unit configured to store a set of log data of a combination of a value of the first index and a value of the second index while the power conversion unit is under control of the scan control unit,
a base setting unit configured to set a baseline representing a change in a base value of the second index in response to a change in the first index based on the log data, and
a width data acquisition unit configured to acquire width input specifying a combination of a value of the first index and a width of the correlation profile,
the upper limit setting unit calculates upper limit values of the second index based on the baseline and a plurality of width inputs and sets the upper limit of the correlation profile by bridging gaps between the upper limit values of the second index with a point sequence or a function, and
the lower limit setting unit calculates lower limit values of the second index based on the baseline and the plurality of width inputs and sets the lower limit of the correlation profile by bridging gaps between the lower limit values of the second index with a point sequence or a function.

(Appendix 11) The power conversion device according to appendix 2, wherein
the first abnormality detection unit detects the abnormality in the controlled object in response to an input including a combination of a value of the first index and a value of the second index using a neural network.

(Appendix 12) The power conversion device according to appendix 2, wherein
the first abnormality detection unit includes
a data transmission unit configured to transmit log data of a combination of a value of the first index and a value of the second index to a server for machine-learning, and
a second determination unit configured to detect an abnormality in the controlled object in response to an input including a combination of a value of the first index and a value of the second index using a neural network built by machine-learning in the server based on the log data.

(Appendix 13) The power conversion device according to any one of appendices 2 to 12, wherein
the first index is a command value or detection value associated with a driving speed of the motor, and
the second index is a detection value associated with a driving force of the motor.

(Appendix 14) The power conversion device according to any one of appendices 2 to 12, wherein
the first index is a command value or detection value associated with a driving force of the motor, and
the second index is a detection value associated with a driving speed of the motor.

(Appendix 15) The power conversion device according to any one of appendices 1 to 14, wherein
the abnormality detection unit includes a second abnormality detection unit configured to detect an abnormality in the controlled object based on a relation between a value of a third index associated with a condition of the motor driving the movable part and a trend value derived from past values of the third index acquired during a period from a predetermined time before to a time of acquisition of the value of the third index.

(Appendix 16) The power conversion device according to appendix 15, wherein
the second abnormality detection unit includes
a trend calculation unit configured to calculate the trend value based on the past values of the third index,
a deviation calculation unit configured to calculate a deviation corresponding to a difference between the value and the trend value of the third index, and
a third determination unit configured to determine whether there is an abnormality in the controlled object based on a magnitude of the deviation.

(Appendix 17) The power conversion device according to appendix 16, wherein
the second abnormality detection unit further includes
a filter processing unit configured to apply, to the deviation, low-pass filtering using past values of the past deviation, and
the third determination unit determines whether there is an abnormality in the controlled object based on the deviation to which the filtering has been applied by the filter processing unit.

(Appendix 18) The power conversion device according to appendix 16 or 17, wherein
the trend calculation unit calculates the trend value of the third index by applying low-pass filtering using the past values of the third index to a value of the third index.

(Appendix 19) A server comprising:
a data storage unit configured to acquire a set of log data of a combination of a value of a first index and a value of a second index from a power conversion device, the power conversion device comprising:
a power conversion unit configured to generate AC power for driving a controlled object including a movable part and a motor configured to drive the movable part and provide the AC power to the motor; and
an abnormality detection unit configured to detect an abnormality in the controlled object based on the first index and the second index associated with a condition of the motor driving the movable part; and
a model building unit configured to build a neural network by machine-learning based on the log data stored in the data storage unit, the neural network being configured to detect an abnormality in the controlled object in response to an input including a combination of a value of the first index and a value of the second index.

(Appendix 20) A data generation method comprising:
acquiring a set of log data of a combination of a value of a first index and a value of a second index from a power conversion device, the power conversion device comprising:
a power conversion unit configured to generate AC power for driving a controlled object including a movable part and a motor configured to drive the movable part and provide the AC power to the motor; and
an abnormality detection unit configured to detect an abnormality in the controlled object based on the first index and the second index associated with a condition of the motor driving the movable part; and
generating data by machine-learning based on the log data stored, the data being used for detecting an abnormality in the controlled object in response to an input including a combination of a value of the first index and a value of the second index.

What is claimed is:

1. A power conversion device comprising:
a switching circuitry configured to supply a driving alternating current (AC) power to a motor of a controlled object that includes the motor and a movable part driven by the motor; and
a control circuitry configured to:
control the switching circuitry to supply the driving AC power to the motor;
acquire index information associated with an operational condition of the motor; and
detect an abnormality in the controlled object based on the index information acquired.

2. The power conversion device according to claim 1, wherein
the index information includes a value of a first index associated with a first operational condition of the motor, and a value of a second index associated with a second operational condition of the motor,
the control circuitry is further configured to detect the abnormality in the controlled object based on a relation between the value of first index and the value of the second index.

3. The power conversion device according to claim 2, wherein
the control circuitry is further configured to:
set an upper limit of the second index that varies in relation to a variation of the first index, and a lower limit of the second index that varies in relation to the variation of the first index; and
detect the abnormality in a case where the value of the second index is outside a range delimited by the upper limit and the lower limit of the second index that are correlated to the value of the first index.

4. The power conversion device according to claim 3, wherein
a difference between the upper limit and the lower limit of the second index, varies depending on the first index.

5. The power conversion device according to claim 4, wherein
the control circuitry is further configured to:
acquire user input combinations, wherein each user input combination includes a first input value associated with the first index and a second input value associated with the second index; and
set the upper limit and the lower limit of the second index based on the user input combinations.

6. The power conversion device according to claim 5, wherein
the user input combinations acquired by the control circuitry include:
first user input combinations associated with the upper limit of the second index; and
second user input combinations associated with the lower limit of the second index,
wherein the control circuitry is configured to:
set the upper limit of the second index based on the first user input combinations; and
set the lower limit of the second index based on the second user input combinations.

7. The power conversion device according to claim 4, wherein
the control circuitry is further configured to:
acquire a log data set of the first index and the second index while modifying the driving AC power supplied to the motor; and
set the upper limit and the lower limit of the second index based on the log data set.

8. The power conversion device according to claim 7, wherein
the control circuitry is further configured to:
control the switching circuitry to modify the driving AC power to vary the first operational condition of the motor that is associated with the first index;
acquire a plurality of log data sets including the log data set, while modifying the driving AC power supplied to the motor; and
set the upper limit and the lower limit of the second index based on a fluctuation among the plurality of the log data sets.

9. The power conversion device according to claim 4, wherein
the control circuitry is further configured to:
control the switching circuitry to modify the driving AC power to vary the first operational condition of the motor that is associated with the first index;
acquire a set of log data of the first index and the second index while the driving AC power supplied to the motor is modified;
based on the log data acquired, set a baseline representing a variation of the second index in relation to the variation of the first index;
acquire user input combinations, wherein each user input combination includes an input value of the first index in association with an input range of the second index; and calculate the upper limit and the lower limit of the second index based on the baseline and the user input combinations.

10. The power conversion device according to claim 3, wherein
the control circuitry is further configured to:
set a baseline representing a variation of the second index in relation to the variation in the first index;
set the upper limit of the second index above the baseline; and
set the lower limit of the second index below the baseline,
so that each value of the first index is associated with a baseline value of the baseline, with an upper limit value that is greater than the baseline value, and with a lower limit value that is less than the baseline value.

11. The power conversion device according to claim 10, wherein
the control circuitry is further configured to:
acquire user input combinations, wherein each user input combination includes a first input value associated with the first index and a second input value associated with the second index; and
set the baseline based on the user input combinations.

12. The power conversion device according to claim 2, wherein
the control circuitry is further configured to detect the abnormality in the controlled object based on data retrieved from a neural network in response to an input combination that is input into the neural network, wherein the input combination includes the value of the first index and the value of the second index.

13. The power conversion device according to claim 2, wherein
the control circuitry is further configured to:
transmit log data of the first index and the second index to a server configured to generate a neural network based on machine-learning using the log data, and
detect the abnormality based on data retrieved from the neural network in response to an input combination including the value of the first index and the value of the second index.

14. The power conversion device according to claim 2, wherein
the first index is associated with a driving speed of the motor, and
the second index is associated with a driving force generated by the motor.

15. The power conversion device according to claim 2, wherein
the first index is associated with a driving force generated by the motor, and
the second index is associated with a driving speed of the motor.

16. The power conversion device according to claim 1, wherein
the index information includes a present value of an index associated with the operational condition of the motor driving the movable part, and a trend value associated with previous values of the index acquired during a period of time prior to acquiring the present value of the index, and
the control circuitry is further configured to detect the abnormality in the controlled object based on a relation between the present value of the index and the trend value.

17. The power conversion device according to claim 16, wherein
the control circuitry is further configured to:
calculate the trend value based on the previous values of the index;
calculate a difference between the present value and the trend value of the index; and
detect the abnormality based on the difference between the present value and the trend value of the index.

18. The power conversion device according to claim 17, wherein
the control circuitry is further configured to:
calculate a filtered difference by applying low-pass filtering to the difference calculated between the present value and the trend value of the index; and
detect the abnormality based on the filtered difference.

19. The power conversion device according to claim 17, wherein
the control circuitry is further configured to calculate the trend value of the index by low-pass filtering using the previous values of the index.

20. A server comprising a circuitry configured to:
acquire a log data of a first index and a second index associated with a condition of a motor driving a movable part from a power conversion device configured to provide a driving AC power to the motor; and
generate a neural network by machine-learning based on the log data, wherein the neural network is configured to detect an abnormality in a controlled object including the motor and the movable part, in response to an input combination including a value of the first index and a value of the second index.

* * * * *